US011509878B2

(12) United States Patent
Wang et al.

(10) Patent No.: US 11,509,878 B2
(45) Date of Patent: Nov. 22, 2022

(54) METHODS AND APPARATUS FOR USING TRACK DERIVATIONS FOR NETWORK BASED MEDIA PROCESSING

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

(*) Notice: Subject to any disclaimer, the term of this patent is extended or adjusted under 35 U.S.C. 154(b) by 0 days.

(21) Appl. No.: 16/567,644

(22) Filed: Sep. 11, 2019

(65) Prior Publication Data

US 2020/0092530 A1  Mar. 19, 2020

Related U.S. Application Data

(60) Provisional application No. 62/741,648, filed on Oct. 5, 2018, provisional application No. 62/731,131, filed on Sep. 14, 2018.

(51) Int. Cl.
  *H04N 13/161*  (2018.01)
  *H04N 13/349*  (2018.01)
  (Continued)

(52) U.S. Cl.
  CPC ......... *H04N 13/161* (2018.05); *H04N 13/194* (2018.05); *H04N 13/282* (2018.05); *H04N 13/349* (2018.05)

(58) Field of Classification Search
  CPC .. H04N 13/161; H04N 13/194; H04N 13/349; H04N 13/282

(Continued)

(56) References Cited

U.S. PATENT DOCUMENTS

2009/0122134 A1* 5/2009 Joung ................. H04N 13/178
                                                348/E13.001
2011/0069153 A1* 3/2011 Nakane ............... H04N 13/178
                                                348/E13.001

(Continued)

OTHER PUBLICATIONS

Wang et al., Deriving VR ROI and Viewport related Tracks in ISOBMFF. International Organisation for Standardisation, Coding of Moving Pictures and Audio, ISO/IEC JTC1/SC29/WG11 MPEG2016/M40412. Apr. 2017:11 pages.

(Continued)

*Primary Examiner* — Joseph G Ustaris
*Assistant Examiner* — Jimmy S Lee
(74) *Attorney, Agent, or Firm* — Wolf, Greenfield & Sacks, P.C.

(57) ABSTRACT

The techniques described herein relate to methods, apparatus, and computer readable media configured to perform media processing. A media processing entity includes at least one processor in communication with a memory, wherein the memory stores computer-readable instructions that, when executed by the at least one processor, cause the at least one processor to perform receiving, from a remote computing device, multi-view multimedia data comprising a hierarchical track structure comprising at least a first track comprising first media data at a first level of the hierarchical track structure, and metadata associated with a second track at a second level in the hierarchical track structure that is different than the first level of the first track. The instructions further cause the processor to perform processing the first media data of the first track based on the metadata associated with the second track to generate second media data for the second track.

19 Claims, 22 Drawing Sheets

(51) Int. Cl.
*H04N 13/194* (2018.01)
*H04N 13/282* (2018.01)

(58) Field of Classification Search
USPC .......................................................... 348/43
See application file for complete search history.

(56) References Cited

U.S. PATENT DOCUMENTS

| 2012/0007948 | A1* | 1/2012 | Suh | H04N 13/178 |
| | | | | 348/42 |
| 2012/0314937 | A1* | 12/2012 | Kim | H04N 13/194 |
| | | | | 382/154 |
| 2013/0162773 | A1* | 6/2013 | Tian | H04N 19/597 |
| | | | | 348/43 |
| 2013/0176297 | A1* | 7/2013 | Broberg | H04N 13/194 |
| | | | | 345/419 |

OTHER PUBLICATIONS

[No Author Listed], Compositing and Blending Level 1. W3C Candidate Recommendation. Jan. 13, 2015: p. 1-33.

[No Author Listed], Image Stitching. Wikipedia. Nov. 15, 2019. https://en.wikipedia.org/wiki/Image_stitching [last accessed Dec. 5, 2019].

[No Author Listed], Information technology—Coded representation of immersive media (MPEG-I)—Part 2: Omnidirectional media format. ISO/IEC JTC1/SC29/WG11. Dec. 11, 2017: 178 pages.

[No Author Listed], Information technology—Coded representation of immersive media (MPEG-I)—Part 2: Omnidirectional media format. ISO/IEC JTC1/SC29/WG11. Apr. 26, 2018: 179 pages.

[No Author Listed], Information technology—Coding of audio-visual objects, Part 12: ISO base media file format. International Standard, ISO/IEC 14496-12, Fifth Edition. Feb. 20, 2015: 250 pages.

[No Author Listed], Information technology—Dynamic adaptive streaming over Http (DASH)—Part 1: Media presentation description and segment formats. International Standard, ISO/IEC 23009-1, Draft Third Edition. Jul. 26, 2018: 218 pages.

Hughes et al., ISO/IEC 23001-7 3nd Edition—Common encryption in ISO base media file format files. International Organization for Standardization, Coding of Moving Pictures and Audio, ISO/IEC JTC1/SC29/WG11 N14849. Oct. 2014: 33 pages.

Park et al., Description of Core Experiments on Network-Based Media Processing. International Organisation for Standardisation, Coding of Moving Pictures and Audio, ISO/IEC JTC1/SC29/WG11, MPEG 2018/w17874. Jul. 2018: 12 pages.

Park et al., Use cases and requirements for NBMP (v4). International Organisation for Standardisation, Coding of Moving Pictures and Audio, ISO/IEC JTC1/SC29/WG11 MPEG2018/N17502. Apr. 2018: 31 pages.

Singer et al., Technologies under Consideration for ISOBMFF. International Organisation for Standardisation, Coding of Moving Pictures and Audio, ISO/IEC JTC1/SC29/WG11 MPEG2018/N17575. Apr. 2018: 53 pages.

Stockhammer et al., MPEG-I Architectures. International Organisation for Standardisation, Coding of Moving Pictures and Audio, ISO/IEC JTC1/SC29/WG11/N17888. Jul. 2018: 11 pages.

Wang et al., Deriving Composite Tracks in ISOBMFF using Track Grouping Mechanisms. Organisation for Standarisation, Coding of Moving Pictures and Audio, ISO/IEC JTC1/SC29/WG11 MPEG2016/M40384. Apr. 2017: 12 pages.

Wang et al., Deriving Composite Tracks in ISOBMFF. International Organisation for Standarisation, Coding of Moving Pictures and Audio, ISO/IEC JTC1/SC29/WG11 MPEG2016/M39971. Jan. 2017: 9 pages.

Wang et al., Deriving VR Projection and Mapping related Tracks in ISOBMFF. International Organisation for Standardisation, Coding of Moving Pictures and Audio, ISO/IEC JTC1/SC29/WG11 MPEG2016/M40385. Apr. 2017: 8 pages.

Wang et al., WD 2 of ISO/IEC 23090-2 OMAF 2nd edition. International Organisation for Standarisation, Coding of Moving Pictures and Audio, ISO/IEC JTC1/SC29/WG11 N17827-v1. Jul. 2018: 209 pages.

* cited by examiner

```
aligned(8) class Projection
extends TransformProperty('proj') {
    bit(1) is_reverse;          ← 802
    bit(7) reserved = 0;
    if (is_reverse == 0)
        ProjectionFormatStruct();   ← 804
}
```

```
aligned(8) class Projection
extends TransformProperty('proj') {
    bit(1) is_reverse;          ← 802
    bit(2) reserved = 0;
    unsigned int(5)
        projection_type;        ← 852
}
```

```
aligned(8) class TransformProperty(property_type, version, flags)
    extends FullBox(property_type, version, flags)
{
} aligned(8) class ImageOperation(){
    entityBitCount = (entity_byte_len_minus1 + 1) * 8;        // 1402
    unsigned int(entityBitCount) num_inputs;
    unsigned int(entityBitCount) num_outputs;                 // 1404
    for (j=0; j<num_outputs; j++) {
        if (num_inputs > 0) {
            for (i=0; i<num_inputs; i++) {
                unsigned int(entityBitCount) entity_idx;      // 1406
                if (IsPictTrack(entity_idx) && sample_offset_flag == 1)
                    unsigned int((sample_offset_byte_len_minus1 + 1)*8) sample_offset;  // 1408
            }
        }
    }
    TransformProperty property;
} aligned(8) class DerivedSample(){
    opIdx = 0;
    do {
        ImageOperation image_operation[opIdx++];
    } while (!EndOfSample());
}
```

```
aligned(8) class VisualDerivationBase extends FullBox (code, version = 0, flags, optional unsigned int(8)[16] uuid_code){
    if (code=='uuid') {
        unsigned int(8)[16] usertype = uuid_code;
    }
    unsigned int(16) parameter_count;
    unsigned int(floor((parameter_count+7)/8)*8) parameter_defined_flags;
    // if the Nth bit is the highest bit set in the flags, then the
    // first through Nth parameters must be present, even if some are
    // not defined by the values here
}

--aligned(8) class VisualDerivationInputs extends FullBox ('dinp'){
    unsigned int(16) input_count;
    unsigned int(floor((input_count+7)/8)*8) input_present_flags;
    unsigned int(16) track_reference_index[];
    // if the Nth bit is the highest bit set in the flags, then there must
    // be N entries in the reference array
}

--aligned(8) class VisualDerivationOutputs extends FullBox ('doup'){          1502
    unsigned int(16) output_count;
    unsigned int(floor((output_count+7)/8)*8) output_present_flags;
    unsigned int(16) track_reference_index[];
    // if the Nth bit is the highest bit set in the flags, then there must
    // be N entries in the reference array
}

--aligned(8) class VisualDerivation extends Box ('dimg'){
    VisualDerivationBase()      derivation;    // actually an instance of a derived class
    VisualDerivationInputs      inputs;        // optional, as noted above
    VisualDerivationOutputs     outputs;       // optional, as noted above
}                                        1504
```

```
<xs:schema targetNamespace="urn:mpeg:mpeg-i:nbmp:2018"
    elementFormDefault="qualified" attributeFormDefault="unqualified">
    <!-- Number of input media tracks -->
    <xs:attribute name="num_inputs" type="xs:integer" default="1"/>    ⟵ 1802
    <!-- Number of output media tracks -->
    <xs:attribute name="num_outputs" type="xs:integer" default="1"/>   ⟵ 1804
    <!-- track derivation transform property for a processing task, e.g.,
        transform property both for encoding all desirable bitrates -->
    <xs:element name="dtrk" type="xs:base64Binary"/>   ⟵ 1806
        <xs:attribute name="tranformProperty" type="xs:string"/>
    </xs:element>
</xs:schema>
```

```
<NBMP xmlns= "urn:mpeg:mpeg-i:nbmp:2018" ... "5" >
<!-- based encoded 'tcdb' box for transcoding at 5 desirable
bitrates -->
    <nbmp:dtrk ................... "tcdb">
    YmFzZTY0IGVuY29kZWQgY29udGVudHMgb2YgKXB
    zc2lSIGJveCB3aXRoIHRoaXMgU3lzdGVtSUQ=
    </nbmp:dtrk>
</NBMP>
```

FIG. 19 ns and Apparatus for Using Track Derivations for Network Based Media Processing

RELATED APPLICATIONS

This Applications claims priority under 35 U.S.C. § 119(e) to U.S. Provisional Application Ser. No. 62/731,131, filed Sep. 14, 2018, entitled "METHOD OF MEDIA PROCESSING RELATED TRACK DERIVATIONS IN ISOBMFF" and U.S. Provisional Application Ser. No. 62/741,648, filed Oct. 5, 2018, entitled "METHOD AND SYSTEM FOR USING ISOBMFF TRACK DERIVATIONS FOR NETWORK BASED MEDIA PROCESSING," which are hereby incorporated by reference in their entirety.

TECHNICAL FIELD

The techniques described herein relate generally to using track derivations for network based media processing, and in particular to using track derivations to specify functions to be performed by media processing entities.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for using track derivations for network based media processing.

Some embodiments relate to a media processing method implemented by a media processing entity. The media processing entity includes at least one processor in communication with a memory, wherein the memory stores computer-readable instructions that, when executed by the at least one processor, cause the at least one processor to perform receiving, from a remote computing device, multi-view multimedia data comprising a hierarchical track structure comprising at least a first track comprising first media data at a first level of the hierarchical track structure, and metadata associated with a second track at a second level in the hierarchical track structure that is different than the first level of the first track. The instructions further cause the at least one processor to perform processing the first media data of the first track based on the metadata associated with the second track to generate second media data for the second track.

In some examples, receiving the multi-view media data from the remote computing device comprises receiving the multi-view media data from a second remote media processing entity.

In some examples, the method further includes transmitting the second track comprising the generated second media data to a second computing device, wherein the second computing device comprises a second media processing entity, a second remote computing device different than the first computing device, or both. The method can include transmitting, to the second media processing entity, metadata associated with a third track at a third level in the hierarchical track structure that is different than the first level of the first track and the second level of the second track.

In some examples, the second level in the hierarchical track structure is above the first level of the first track, and processing the first media data of the first track comprises decoding the first media data of the first track to generate the second media data for the second track. Receiving the metadata associated with the second track can include receiving metadata indicative of a transform property specifying one or more of: a stitching operation to stitch images of the first media data of the first track and map the stitched images onto a projection surface to generate the second media data; a reverse projection operation to project images of the first media data onto a three-dimensional sphere to generate the second media data; a reverse packing operation to perform one or more of transforming, resizing, and relocating one or more regions of the first media data to generate the second media data; a reverse sub-picture operation to compose the second media data from a plurality of tracks, the plurality of tracks comprising the first track and one or more additional tracks; a selection of one operation to construct sample images from the first media data to generate the second media data; a transcoding operation to transcode the first media data from a first bitrate to a second bitrate to generate the second media data; a scaling operation to scale the first media data from a first scale to a second scale to generate the second media data; and a resizing operation to resize the first media data from a first width and a first height to a second width and a second height to generate the second media data.

In some examples, the second level in the hierarchical track structure is below the first level of the first track, and processing the first media data of the first track comprises encoding the first media data of the first track to generate the second media data for the second track. Receiving the metadata associated with the second track comprises receiving metadata indicative of a transform property specifying one or more of: a projection operation to project images of the first media data onto a two-dimensional plane to generate the second media data; a packing operation to perform one or more of transforming, resizing, and relocating one or more regions of the first media data to generate the second media data; a sub-picture operation to compose a plurality of different media data for a plurality of tracks, the plurality of tracks comprising the second track and one or more additional tracks; a viewport operation to construct viewport sample images from spherical sample images of the first media data to generate the second media data; a transcoding operation to transcode the first media data from a first bitrate to a second bitrate to generate the second media data; a scaling operation to scale the first media data from a first scale to a second scale to generate the second media data; and a resizing operation to resize the first media data from a first width and a first height to a second width and a second height to generate the second media data.

In some examples, the metadata specifies a plurality of output tracks, and specifies how to generate each of the plurality of output tracks.

In some examples, the metadata associated with the second track includes a data structure specifying a transform property to perform on the first media data to generate the second media data, the data structure comprising a number of inputs, a number of outputs, and the transform property. The second track can include the data structure.

Some embodiments relate to an apparatus configured to process video data. The apparatus includes a processor in communication with memory, the processor being configured to execute instructions stored in the memory that cause the processor to receive, from a remote computing device, multi-view multimedia data comprising a hierarchical track structure comprising at least a first track comprising first media data at a first level of the hierarchical track structure, and metadata associated with a second track at a second level in the hierarchical track structure that is different than the first level of the first track. The instructions further cause the processor to process the first media data of the first track based on the metadata associated with the second track to generate second media data for the second track.

In some examples, receiving the multi-view media data from the remote computing device includes receiving the multi-view media data from a second remote media processing entity.

In some examples, the instructions further cause the processor to transmit (a) the second track comprising the generated second media data and (b) metadata associated with a third track at a third level in the hierarchical track structure that is different than the first level of the first track and the second level of the second track, to a second remote computing device, wherein the second computing device comprises a second media processing entity, a second remote computing device different than the first computing device, or both.

In some examples, the second level in the hierarchical track structure is above the first level of the first track, and processing the first media data of the first track comprises decoding the first media data of the first track to generate the second media data for the second track. Receiving the metadata associated with the second track can include receiving metadata indicative of a transform property specifying one or more of: a stitching operation to stitch images of the first media data of the first track and map the stitched images onto a projection surface to generate the second media data; a reverse projection operation to project images of the first media data onto a three-dimensional sphere to generate the second media data; a reverse packing operation to perform one or more of transforming, resizing, and relocating one or more regions of the first media data to generate the second media data; a reverse sub-picture operation to compose the second media data from a plurality of tracks, the plurality of tracks comprising the first track and one or more additional tracks; a selection of one operation to construct sample images from the first media data to generate the second media data; a transcoding operation to transcode the first media data from a first bitrate to a second bitrate to generate the second media data; a scaling operation to scale the first media data from a first scale to a second scale to generate the second media data; and a resizing operation to resize the first media data from a first width and a first height to a second width and a second height to generate the second media data.

In some examples, the second level in the hierarchical track structure is below the first level of the first track, and processing the first media data of the first track comprises encoding the first media data of the first track to generate the second media data for the second track. Receiving the metadata associated with the second track can include receiving metadata indicative of a transform property specifying one or more of: a projection operation to project images of the first media data onto a two-dimensional plane to generate the second media data; a packing operation to perform one or more of transforming, resizing, and relocating one or more regions of the first media data to generate the second media data; a sub-picture operation to compose a plurality of different media data for a plurality of tracks, the plurality of tracks comprising the second track and one or more additional tracks; a viewport operation to construct viewport sample images from spherical sample images of the first media data to generate the second media data; a transcoding operation to transcode the first media data from a first bitrate to a second bitrate to generate the second media data; a scaling operation to scale the first media data from a first scale to a second scale to generate the second media data; and a resizing operation to resize the first media data from a first width and a first height to a second width and a second height to generate the second media data.

In some examples, the metadata associated with the second track includes a data structure specifying a transform property to perform on the first media data to generate the second media data, the data structure comprising a number of inputs, a number of outputs, and the transform property.

Some embodiments relate to at least one computer readable storage medium storing processor-executable instructions that, when executed by at least one processor, cause the at least one processor to perform receiving, from a remote computing device, multi-view multimedia data comprising a hierarchical track structure comprising at least a first track comprising first media data at a first level of the hierarchical track structure, and metadata associated with a second track at a second level in the hierarchical track structure that is different than the first level of the first track. The instructions further cause the at least one processor to process the first media data of the first track based on the metadata associated with the second track to generate second media data for the second track.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 8A is a first exemplary syntax for a projection transform property, according to some embodiments.

FIG. 8B is a second exemplary syntax for a projection transform property, according to some embodiments.

FIG. 14 shows an exemplary syntax for outputting a group of tracks, according to some embodiments.

FIG. 15 shows another exemplary syntax for outputting a group of tracks, according to some embodiments.

FIG. 18 shows an exemplary XML format schema, according to some embodiments.

FIG. 19 is an example XML element that captures a transcoding task that outputs a track group of five tracks, according to some embodiments.

DETAILED DESCRIPTION OF INVENTION

Various techniques are described herein that can be used for network based media processing. The inventors have discovered and appreciated it can be desirable to perform media processing functions using network-based resources, such as by using cloud-based resources. However, existing frameworks are at their infancy in terms of development. While a general framework has been proposed that includes media processing entities (MPEs) to perform network-based media processing, the current design centers around use of a traditional flat file format for the multimedia data (e.g., an MPEG-2 transport stream) and specifies processing functions using a indexed-based look-up approach. The inventors have discovered and appreciated advantages of using hierarchical track structures, including using track derivation techniques. However, current network based frameworks do not support hierarchical track structures.

The techniques described herein provide for using hierarchical track structures in network based processing architectures. In particular, the techniques provide for using track derivation techniques to provide instructions to media processing entities. In some examples, an MPE receives the input track(s) and an associated derived track that specifies a transform property to perform on the input track(s) to generate one or more output tracks (e.g., samples for a single output track, track groups of multiple output tracks, etc.). Therefore, the techniques leverage derived tracks to specify processing functions for network-based media processing. In some embodiments, the techniques can include using format schemas to standardize the interfaces between components in the architecture (e.g., including between the media source and MPEs, as well as between MPEs), such as by using XML schemas to present uniform techniques that can be used to express the transform properties.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
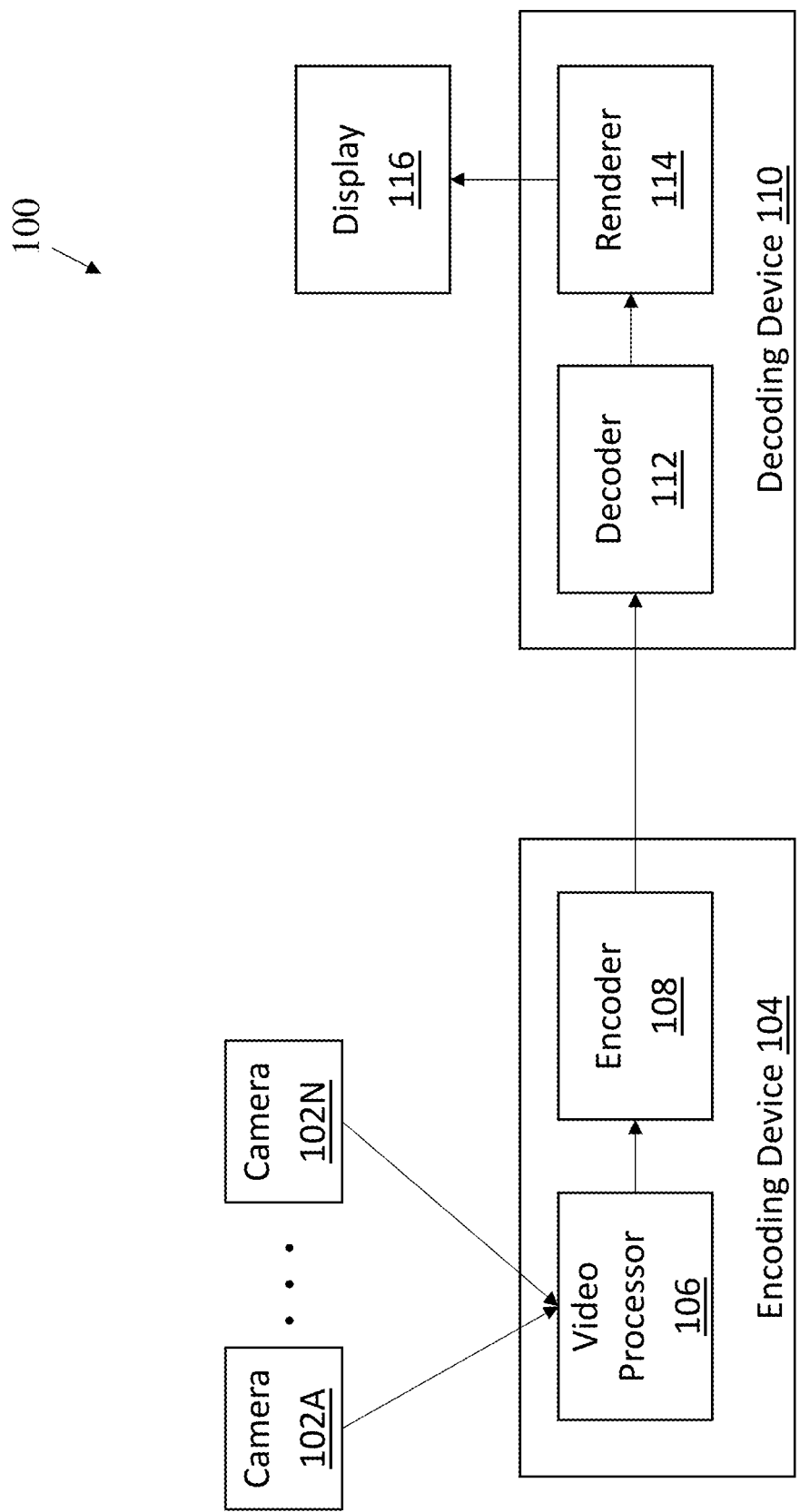
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
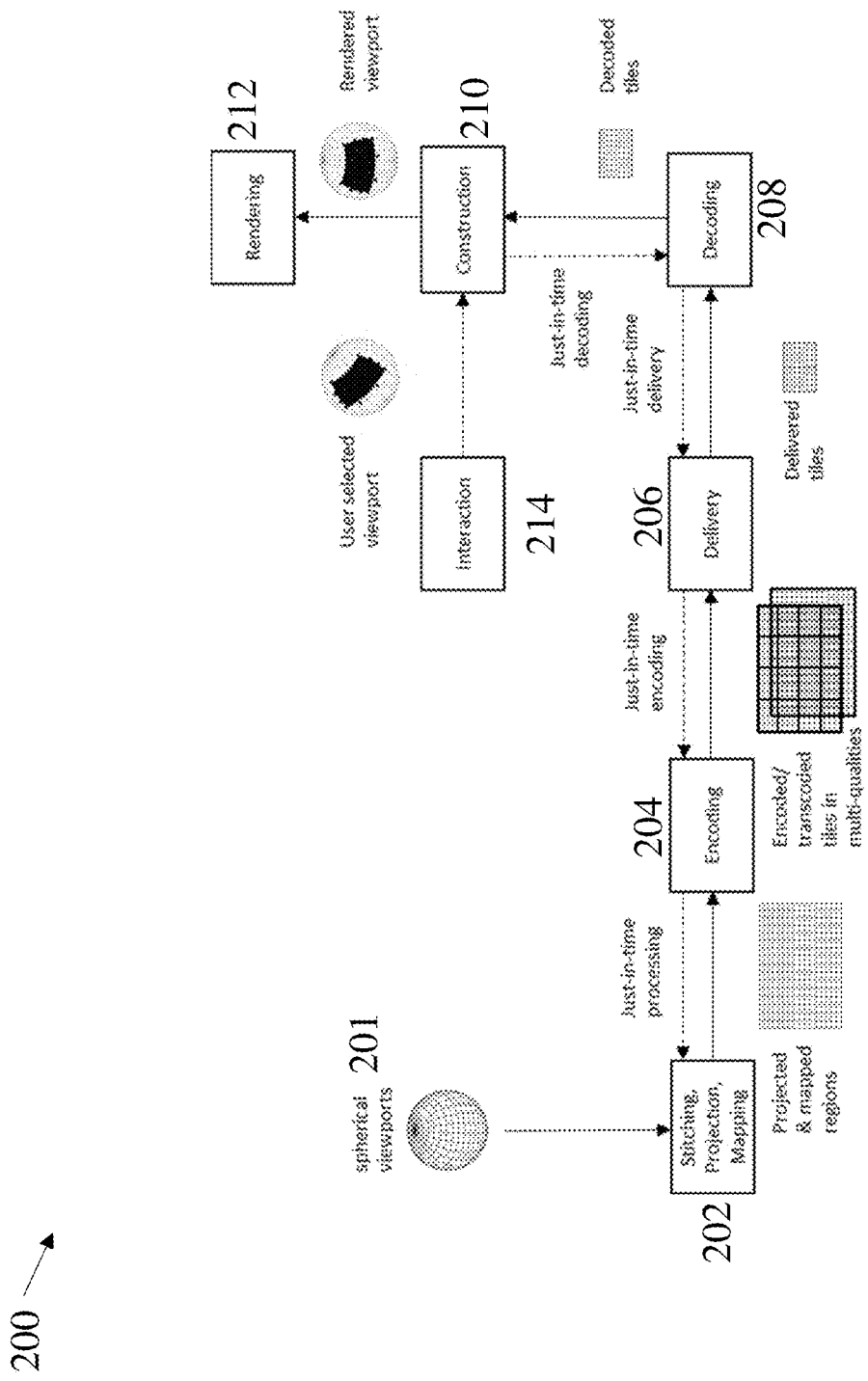
FIG. 2 a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
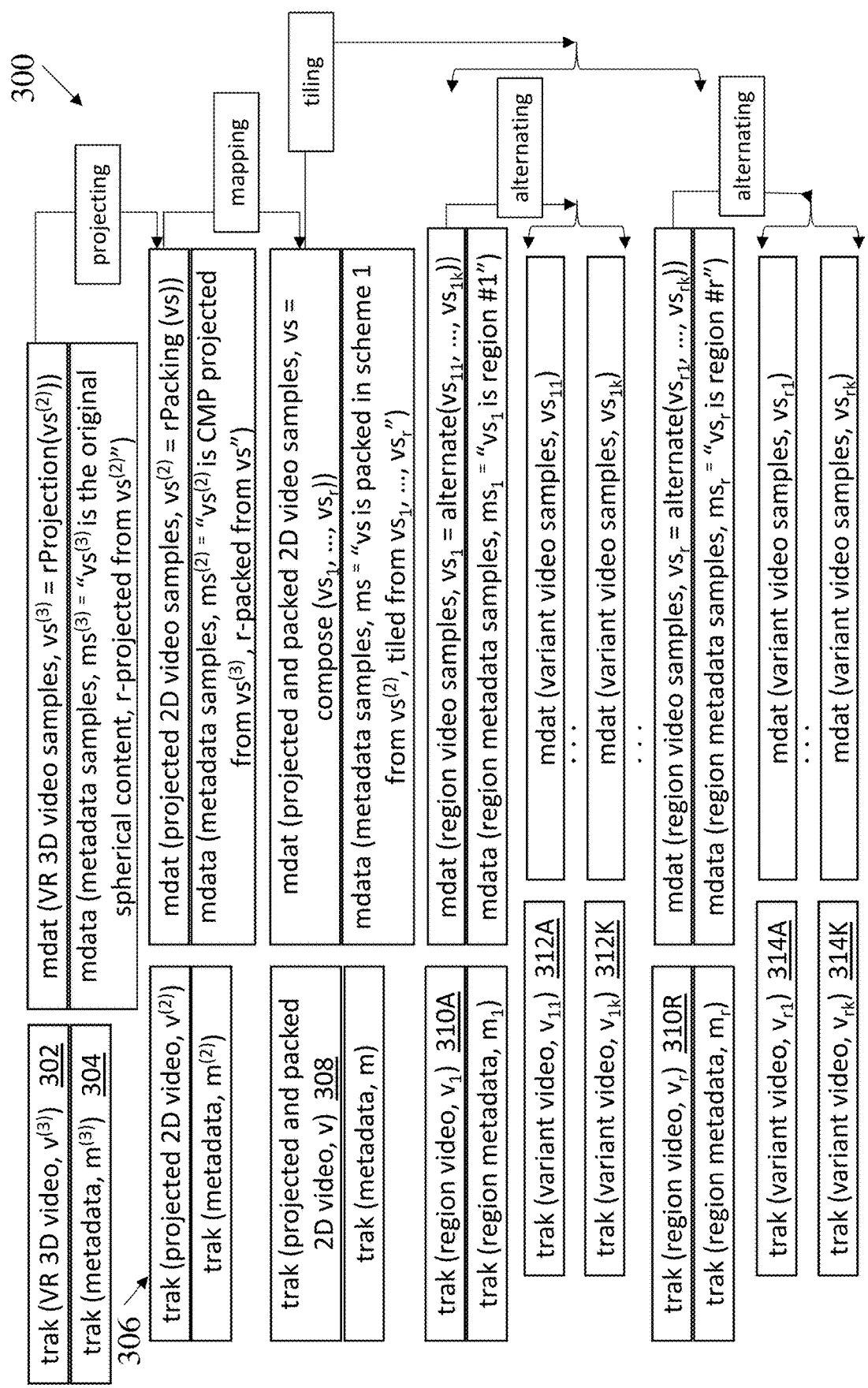
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118th meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmpl', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format,"

120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

Figure 4:
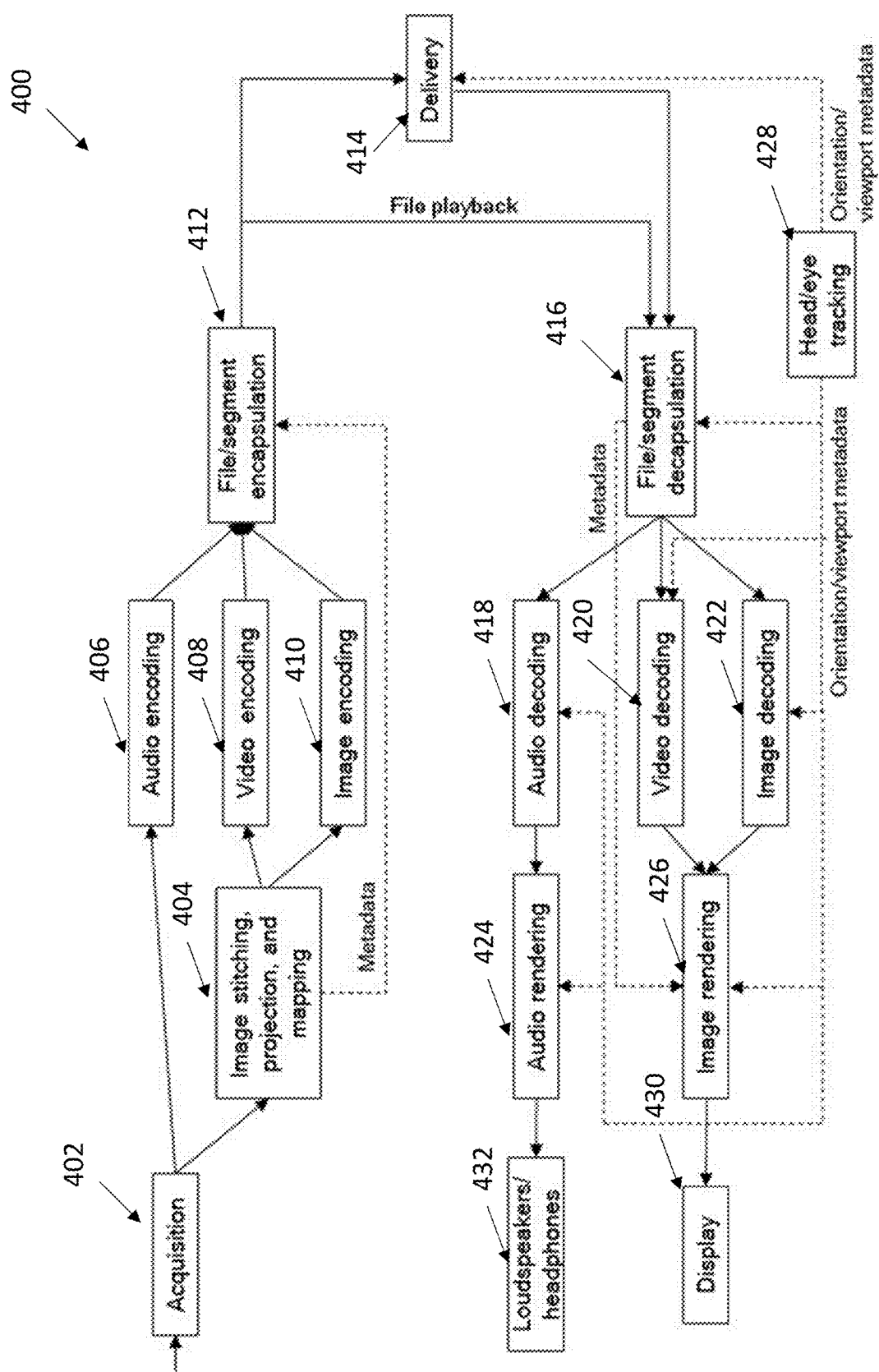
FIG. 4 is an exemplary diagram of an encoding and decoding architecture, according to some examples.

FIG. 4 is an exemplary diagram of an encoding and decoding architecture 400, according to some examples. The architecture 400 can address applications that provide up to three degrees of freedom navigation in VR360 audiovisual media. The architecture 400 can be an MPEG-I architecture, such as that addressed by the first version of MPEG-I part 2 (OMAF), which is described in N17563, "Revised text of ISO/IEC FDIS 23090-2 Omnidirectional Media Format", April 2018, San Diego, US, which is hereby incorporated by reference herein in its entirety. As shown, the architecture 400 includes an acquisition component 402 that acquires the multimedia data that is in communication with an image stitching, projection and mapping component 404 and an audio encoding component 406. The image stitching, projection and mapping component 404 is in communication with the video encoding component 408 and the image encoding component 410. The audio encoding component 406, video encoding component 408 and the image encoding component 410 are in communication with the file/segmentation encapsulation component 412, which can also receive metadata from the image stitching, projection and mapping component 404. Components 404-412 can be considered encoding components of the architecture 400.

The file/segmentation encapsulation component 412 is in communication with the delivery component 414, both of which are in communication with the file/segmentation decapsulation component 416. The file/segmentation decapsulation component 416 is in communication with the audio decoding component 418, the video decoding component 420, and the image decoding component 422. The audio decoding component 418 is in communication with the audio rendering unit 424, which is in communication with an audio output device 432, such as loudspeakers or headphones. The video decoding unit 420 and the image decoding unit 422 are in communication with the image rendering component 426, which is in communication with the display 430. As shown, a head/eye tracking component 428 can be used to provide orientation/viewport metadata to the delivery component 414, the file/segment decapsulation component 416, the video decoding component 420, the image decoding component 422, the image rendering component 426, the audio decoding component 418, and the audio rendering component 424. The file/segment decapsulation component can provide metadata to the image rendering component 426. Components 416 through 428 can be considered decoding components of the architecture 400. For 3DoF, the head/eye tracking component 428 interacts with a user's head to track the head movement and provide feedback, as shown, to determine what media data to deliver.

Figure 5:
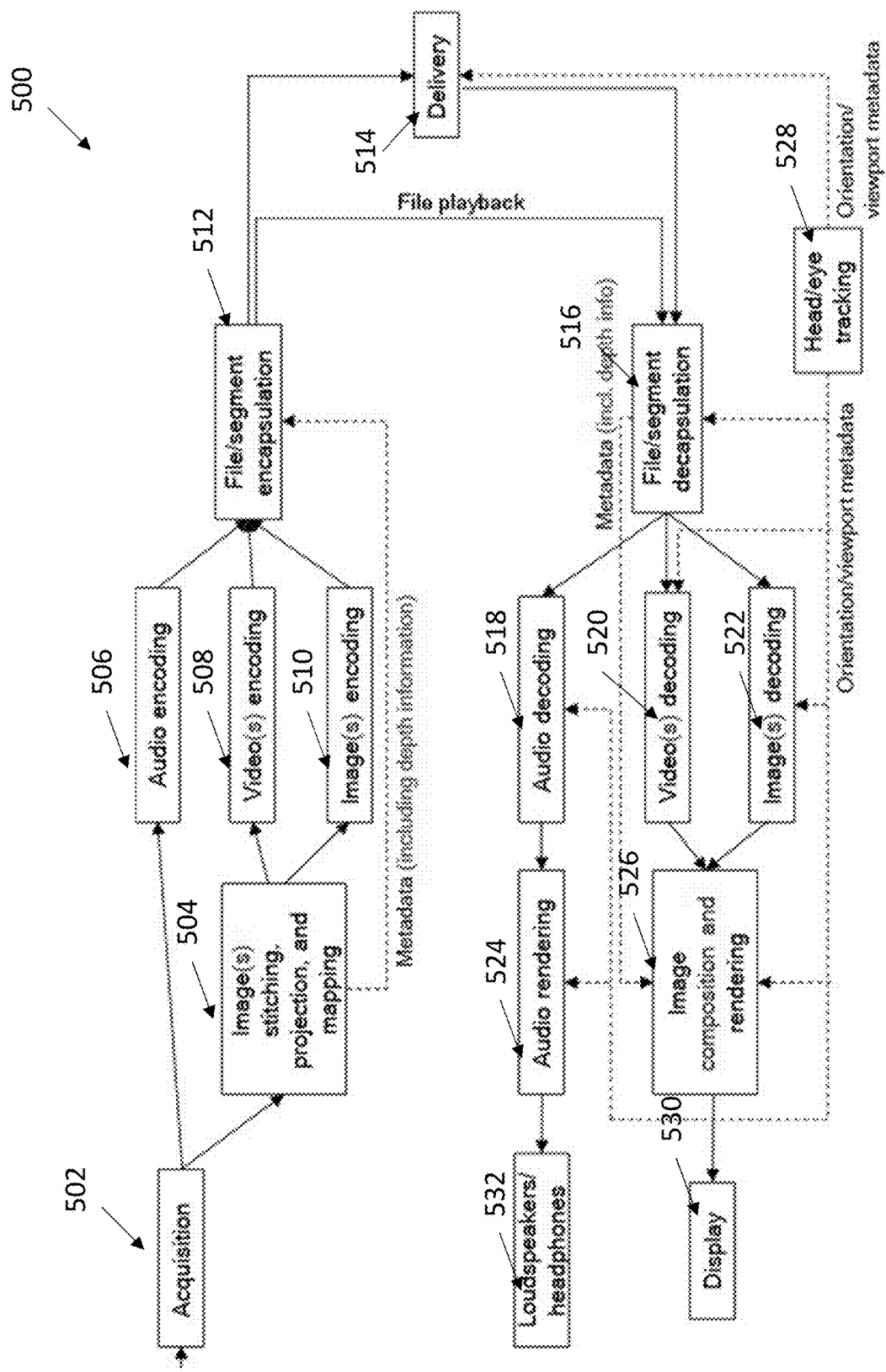
FIG. 5 shows an exemplary diagram of an encoding and decoding architecture, according to some examples.

FIG. 5 shows an exemplary diagram of an encoding and decoding architecture 500, according to some examples. The architecture 500 can be, for example, another exemplary architecture of MPEG-I (e.g., compared to architecture 500) designed to support not only navigation with 3 degrees of freedom, but also limited room for the user to move their head laterally. MPEG-I architectures like those shown in FIGS. 4-5 are described in, for example, N17888, "MPEG-I Architecture", July 2018, Ljubljana, SK, which is hereby incorporated by reference herein in its entirety.

The architecture 500 includes an acquisition component 502 that acquires the multimedia data that is in communication with an image(s) stitching, projection and mapping component 504 and an audio encoding component 506. The image(s) stitching, projection and mapping component 504 is in communication with the video(s) encoding component 508 and the image(s) encoding component 510. The audio encoding component 506, video(s) encoding component 508 and the image(s) encoding component 510 are in communication with the file/segmentation encapsulation component 512, which can also receive metadata (including depth information) from the image stitching, projection and mapping component 504. Components 504-512 can be considered encoding components of the architecture 500.

The file/segmentation encapsulation component 512 is in communication with the delivery component 514, both of which are in communication with the file/segmentation decapsulation component 516. The file/segmentation decapsulation component 516 is in communication with the audio decoding component 518, the video(s) decoding component 520, and the image(s) decoding component 522. The audio decoding component 518 is in communication with the audio rendering unit 524, which is in communication with an audio output device 532, such as loudspeakers or headphones. The video(s) decoding unit 520 and the image(s) decoding unit 522 are in communication with the image composition and rendering component 526, which is in communication with the display 530. As shown, a head/eye tracking component 528 can be used to provide orientation/viewport metadata to the delivery component 514, the file/segment decapsulation component 516, the video(s) decoding component 520, the image(s) decoding component 522, the image composition and rendering component 526, the audio decoding component 518, and the audio rendering component 524. The file/segment decapsulation component 416 can provide metadata (including depth information) to the image composition and rendering component 526. Components 516 through 528 can be considered decoding components of the architecture 500.

Compared to architecture 400, components 504, 508, 510, 520 and 522 can handle more than one image or video, accordingly. Additionally, the metadata provided from the image(s) stitching, projection and mapping component 504 and from the file/segment decapsulation component 516 can include depth information. Further, compared to the image rendering component 426 in FIG. 4, the image composition and rendering component 526 includes composition. Essentially, for 3DoF+, there can be more videos or images that need to be encoded in order to allow a user to move their head to view multimedia content at different angles and positions. Therefore, the architecture 500 includes aspects to handle the additional content.

The processing functions (e.g., the MPEG-I processing functions) described in the architectures above can be implemented using various frameworks. In some embodiments, the framework can be used to perform network-based media processing using network resources, such as cloud-based resources. For example, some or all of the media processing can be performed in the cloud (e.g., prior to delivery to an end device). As described further herein, one or more cloud-based media processing entities can be used to provide network-based multimedia processing functionality. For example, one entity can perform projection, another entity can perform mapping, a third performs stitching, and/or the like. Therefore, a pool of entities can be created to implement desired functionality.

Figure 6A:
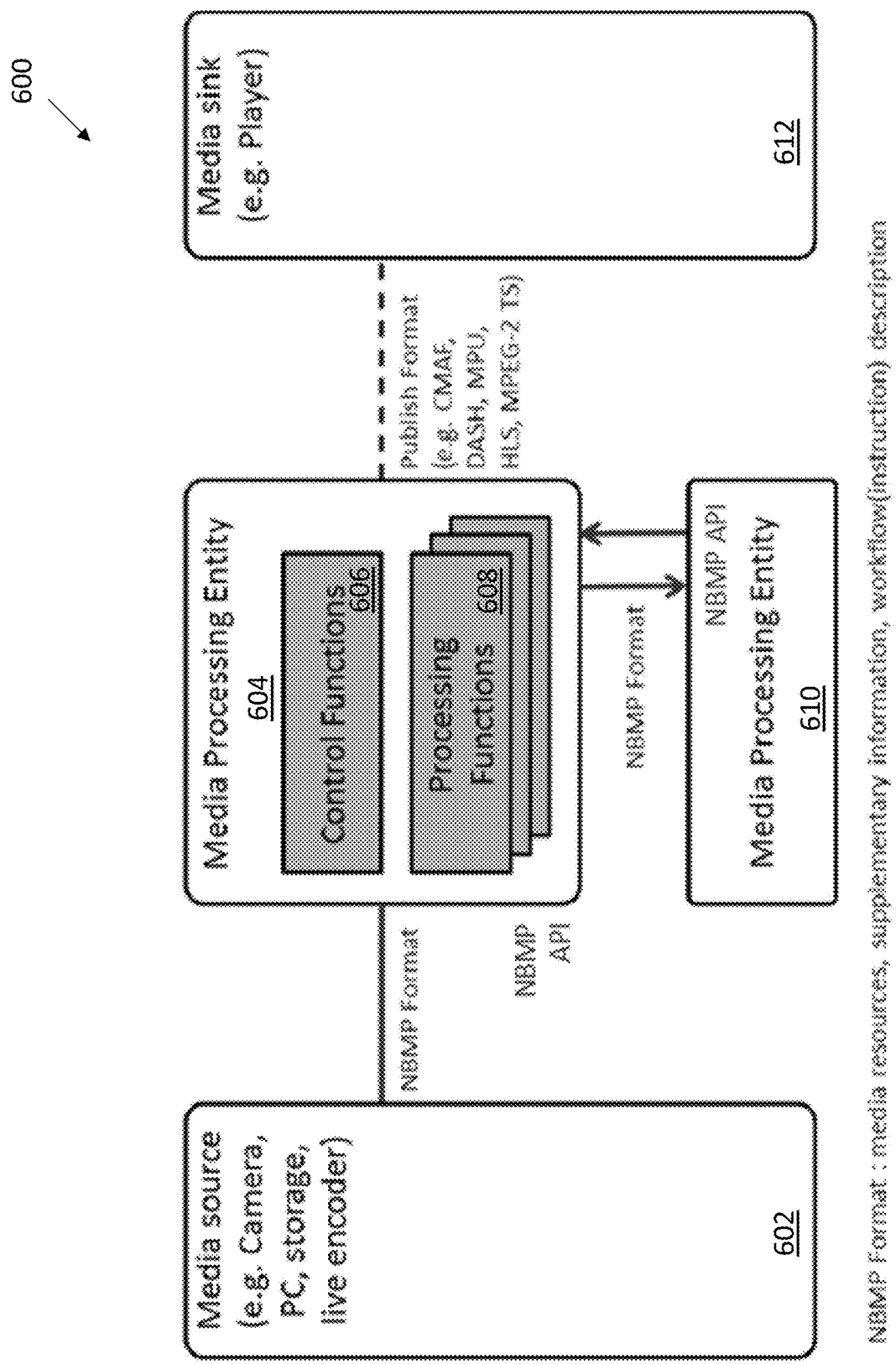
FIG. 6A shows an example of a media processing framework, according to some embodiments.

FIG. 6A shows an example of the media processing framework 600, which can be used to implement some of the processing functions using network-based resources (e.g., cloud resources). An example of such a media processing framework is proposed by the Network-Based Media Processing (NBMP) activity in N17502, "Use cases and requirements for NBMP (v4)", April 2018, San Diego, US, which is hereby incorporated by reference herein in its entirety. The media processing framework 600 includes a media source 602, such as a camera, a personal computer, storage, and/or a live encoder. The media source 602 provides content to the media processing entity (MPE) 604 using the NBMP format. As shown in FIG. 6A, multiple MPEs can be used; in this example, MPE 604 communicates with a second MPE 610 using the NBMP format. Each MPE can include control function(s) and/or processing function(s), as shown for MPE 604, which includes control functions 606 and processing functions 608. The MPE 604 communicates multimedia data to a media sink 612, such as a media player. The multimedia data can be in a publish format such as the Common Media Application Format (CMAF), Dynamic Adaptive Streaming over HTTP (DASH), Multimedia Processing Unit (MPU), HTTP Live Streaming (HLS), MPEG-2 transport stream (TS), and/or the like.

Figure 6B:
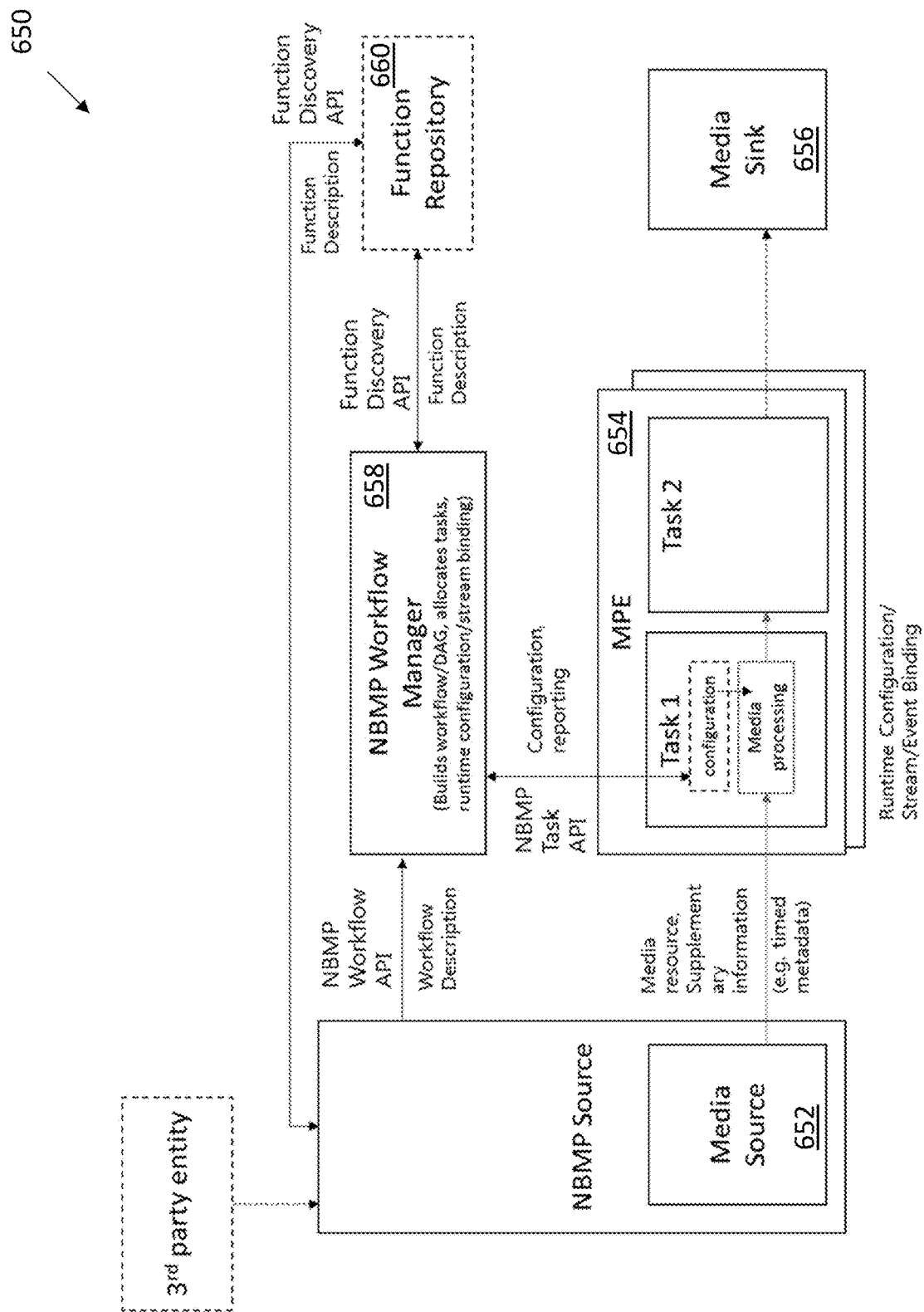
FIG. 6B shows another example of a media processing framework, according to some examples.

FIG. 6B shows another example of a media processing framework 650, according to some examples. Similar to FIG. 6A, the framework 650 includes a media source 652 (which is a NBMP source), a set of one or more MPEs 654 (configured to execute one or more tasks, shown in this example as Task 1 and Task 2), and a media sink 656. The framework 650 also includes an NBMP workflow manager 658 that is in communication with the MPE 654 (e.g., Task 1, in this example) and an optional function repository 660.

When existing media sources are stored or encapsulated in media tracks of ISOBMFF (e.g., as described in ISO/IEC 14496-12:2015 "Information technology—Coding of audio-visual objects—Part 12: ISO Base Media File Format," which is hereby incorporated by reference herein in its entirety), a visual track can be constructed as a derived track (e.g., where a derived track is a track with a number of input tracks) identified by its containing sample entry of type 'dtrk'. A derived sample can contain an ordered list of the operations to be performed on an ordered list of input images or samples. Each of the operations can be specified or indicated by the transform property, also referred to herein as a TransformProperty. Therefore a derived track can contain instructions, in the form of TransformProperty items, on how to generate/produce its content data (e.g., samples) from the content data of its input tracks. Because derived tracks are also tracks, derived tracks can be used, in conjunction with non-derived tracks, to derive other derived tracks and to form hierarchies of track derivations and to build workflows of track derivations. Examples of TransformProperties include: (1) 'idtt': identity, (2) 'clap': clean aperture, (3) 'srot': rotation, (4) 'dslv': dissolve, (5) '2dcc': ROI crop, (6) 'tocp': Track Overlay Composition, (7) 'tgcp': Track Grid Composition, (8) 'tgmc': Track Grid Composition using Matrix values, (9) 'tgsc': Track Grid Sub-Picture Composition, (10) 'tmcp': Transform Matrix Composition, (11) 'tgcp': Track Grouping Composition, and (12) 'tmcp': Track Grouping Composition using Matrix Values.

In many applications such as VR, FTV and NBMP, it can desirable to signal and derive tracks as results of media processing from existing tracks in ISOBMFF. Further, it can be desirable to construct derived tracks and perform derived track processing using network based media processing. For example, for viewport processing, the receiving device (e.g., mobile device) may not be able to take into account various processing considerations, such as network resource constraints, bandwidth, power consumption, and/or the like. Since a mobile device is unable to take into account such considerations, it can make rendering a viewport within a mobile device more and more difficult, and therefore it is desirable to move aspects of viewport rendering into network-based/cloud-based resources. However, current network based media processing frameworks are based on flat file formats, and therefore do not support hierarchical track structures (or performing track derivation operations, such as to support the VR viewport dependent content flow process). For example, the typical input to an MPE is a flat ISO file format, MPEG-2 transport stream, and/or the like. Further, the current configuration of MPE processing is to provide an identifier for a particular MPE function, and the MPE looks up the identifier in a repository or database to determine the semantics of a particular function. Therefore, the current input to an MPE does not provide any actual specification of the functionality to be performed by the MPE.

The techniques described herein provide for using a track hierarchy structure with network based media processing frameworks. In some examples, each network-based MPE can perform one or more track derivation operations, such that each of the processing functions can be implemented as a track derivation. For example, referring to FIG. 6A, the input to each MPE can be (1) one or more input tracks and (2) a derived track, where each derived track can have any number of input tracks. The derived track specifies one or more transform properties, such that the MPE will be configured to construct the samples for the derived track using the input track(s). In some embodiments, the derived track can be the output of the processing of a particular MPE. Therefore, a set of MPEs can implement the whole encoding and/or decoding architecture by using various input tracks and associated derived tracks for each step to provide processing function descriptions for the track derivations. Therefore, the techniques can use track derivation as a way to provide instructions for implementing the multimedia processing to be performed by a particular MPE.

The techniques described herein also provide illustrative examples of new transform property items for track derivations to media processing operations discussed above in the 3DoF and 3DoF+ architectures. While certain exemplary syntaxes are provided herein in conjunction with these examples, it should be appreciated that such configurations, including exemplary function names, parameters, associated functionality, and/or the like, are used as examples only and are not intended to be limiting. As described further herein, the exemplary transform properties can include: 'stch': (e.g., omnidirectional video) stitching; 'proj': (e.g., omnidirectional video) projection, 'pack': (omnidirectional video) packing; 'subp': (e.g., omnidirectional video) sub-picture; 'trsc': transcoding (e.g., at a desired bitrate); 'vpot': (e.g., omnidirectional video) viewport (e.g., for pre-rendering); 'sel1': selection of one; 'scal': scaling; and/or 'srez': resizing. As additional examples, encryption and decryption (e.g., reverse encryption) can be provided, such as by using a timed metadata track (e.g., similar to using a viewport operation) or not using a timed metadata track (e.g., similar to using projection and packing operations), such as according to the Common Encryption described in N14849, "ISO/IEC 23001-7 3nd Edition—Common encryption in ISO base media file format files". October 2014, Strasbourg, Fr., which is hereby incorporated by reference herein in its entirety. Other operations such as super resolution and QoE-based upscaling identified in NBMP can also be similarly provided.

The techniques also provide mechanisms for deriving a collection of tracks or a track group as an output of a track derivation operation. Such mechanisms can be useful for use cases where, for example, multiple derived tracks need to be grouped together to indicate their relationships, such as transcoding at different bitrates for adaptive streaming (e.g., as done in DASH, such as described in N17813, "Revised text of ISO/IEC FDIS 23009-1 3rd edition", July 2018, Ljubljana, SK, which is hereby incorporated by reference herein in its entirety) or sub-picture track generation for viewport-dependent immersive media processing (e.g., as done in OMAF). For illustrative purposes, such track group derivation mechanisms are illustrated by two example transform properties: 'subp': (e.g., omnidirectional video) sub-picture and 'trsc': transcoding (e.g., at a desired bitrate), which are intended to be illustrative and not limiting.

In some embodiments, a stitching transform property can be provided, such as the stitching 'stch' transform property, which can be optional for each sample and specified in any quantity. The stitching transform property can provide information for the process of stitching images of input tracks and map them onto to a projection surface to form a stitched visual track (e.g., according to various blending parameters, as are known, such as those used for image stitching described at https://en.wikipedia.org/wiki/Image_stitching, which is hereby incorporated by reference herein in its entirety). In some embodiments, the transcoding 'stch' transform property, when present, can include a num_inputs that is greater than 1, and the input entities for the corresponding stitching operation can be visual tracks. When an input entity is a visual item, it can be treated like a visual track of a sample comprising of the same visual item.

In some embodiments, the stitching transform property can specify the width and height of each of the input entities, a projection surface type of a derived sample resulting from stitching corresponding samples of the input entities, and an optional blending mode for blending overlaid areas of the input samples. The width and height parameters can be omitted, such as if it is assumed that their values are carried in the input entities. In some examples, this transform property can be split into a number of transform properties, each of which corresponds to a specific projection surface type, which can eliminate the signaling of the projection surface type. For instance, for omnidirectional video stitching where the projection surface type is spherical, as in the use case of Cloud-based 360 VR Stitching (e.g., section 4.1.5 of N17502), a transform property 'ovst' (for "omnidirectional video stitching") can be specified in the same manner as 'stch' but omitting the projection surface type. Similarly, for panorama stitching where the projection surface type is a 2D plane, as in the use case of Network-assisted VR stitching (e.g., section 4.1.1 of N17502), a transform property 'pvst' (for "panorama video stitching") can be specified. In some examples, the transform property may only provide parameters that are needed for performing video stitching. In such examples, it can be up to an implementation of the stitching track derivation to figure out how to perform video stitching (e.g., correctly, effectively and/or efficiently), such as by considering, for example, the projection surface type and blending mode.

Figure 7:
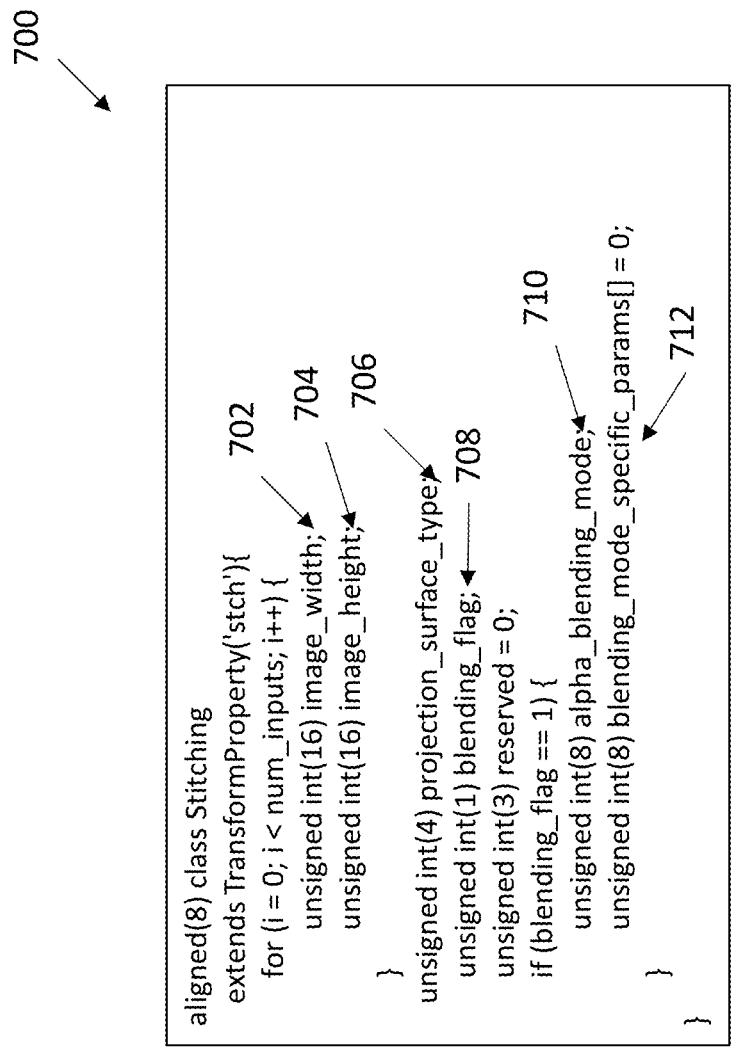
FIG. 7 shows an exemplary syntax for a stitching transform property, according to some examples.

FIG. 7 shows an exemplary syntax 700 for a stitching transform property, according to some examples. The image_width 702 and image_height 704 can specify, respectively, the width and height of the image in units of luma samples. The projection surface_type 706 can specify a type of surface the stitched sample is to be projected onto, such as a value of 0 for Rectilinear, 1 for Spherical, 2 for Cylindered, 3 for Cubic, and 4~15 being reserved. The blending_flag 708 can indicate if blending is involved when stitching overlaying areas of the input visual entities. The alpha_blending_mode 710 can specify the alpha blending mode with values in the exemplar Table 1, below.

TABLE 1

| Value | Compositing mode | Description |
|---|---|---|
| 1 | Clear | No regions are enabled. |
| 2 | Source | Only the source will be present. |
| 3 | Destination | Only the destination will be present. |
| 4 | Source Over | Source is placed over the destination. |
| 5 | Destination Over | Destination is placed over the source. |
| 6 | Source In | Source that overlaps the destination, replaces the destination. |
| 7 | Destination In | Destination which overlaps the source, replaces the source. |
| 8 | Source Out | Source is placed, where it falls outside of the destination. |
| 9 | Destination Out | Destination is placed, where it falls outside of the source. |
| 10 | Source Atop | Source which overlaps the destination, replaces the destination. Destination is placed elsewhere. |
| 11 | Destination Atop | Destination which overlaps the source replaces the source. Source is placed elsewhere. |
| 12 | XOR | The non-overlapping regions of source and destination are combined. |
| 13~16 | Reserved | |
| 17 | Dissolve | Takes random pixels from both layers. With high opacity, most pixels are taken from the source layer. With low opacity most pixels are taken from the destination layer. |
| 18 | Plus | Display the sum of the source image and destination image. |
| 19 | Multiply | The source color is multiplied by the destination color and replaces the destination. |
| 20 | Screen | The values of the pixels in the two layers are inverted, multiplied, and then inverted again |
| 21 | Overlay | Overlay combines Multiply and Screen blend modes. |
| 22 | Darken | Selects the darker of the destination and source colors. |
| 23 | Lighten | Selects the lighter of the destination and source colors |
| 24 | Color_dodge | Brightens the destination color to reflect the source color |
| 25 | Color_burn | Darkens the destination color to reflect the source color |
| 26 | Hard_light | Multiplies or screens the colors, depending on the source color value. |
| 27 | Soft_light | Darkens or lightens the colors, depending on the source color value. |
| 28 | Difference | Subtracts the darker of the two constituent colors from the lighter color |
| 29 | Exclusion | Produces an effect similar to that of the Difference mode but lower in contrast. |
| 30~255 | Reserved | For new modes or non-separable blending modes. |

Table 1 is for exemplary purposes, as such a table (e.g., and the associated algorithms with default parameters) may be defined in a separate document, such as ISO/IEC 23001-8 or "W3C: Composing and Blending 1.0", W3C Candidate Recommendation, January 2015, which is hereby incorporated by reference herein in its entirety. In some examples, a parameter, such as the parameter value of 'layer' in TrackHeaderBox of each tracks which specifies the front-to-back ordering of visual tracks, may be set and used as a relative front and back layer indicator for compositing two tracks. In Table 1, the terms 'Source' and 'Destination' can be the front/top layer and the back/bottom layer or the backdrop, respectively.

The blending_mode_specific_params 712 can specify optional parameters with a given blending mode. For example, blending_mode_specific_params 712 can be used to specify other parameters than using those of default values specified in, e.g. ISO/IEC 23001-8, such as alpha channel data. In some embodiments, the blending related parameters can be specified in the same way as in the ISOBMFF TuC N17833, "Technologies under Consideration for ISOBMFF", July 2018, Ljubljana, SK, which is hereby incorporated by reference herein in its entirety.

In some embodiments, a projection transform property can be provided, such as the projection 'proj' transform property, which can be optional for each sample and specified in any quantity. The projection 'proj' transform property can provide information for the process of projecting images of an input track onto a 2D plane to form a derived track, such as according to a projection format such as the Equirectangular Projection (ERP) and Cube Map Projection (CMP) as given in OMAF. An indicator is_reverse can be used to indicate whether the operation is a (forward) projection construction or reverse projection one. The projection 'proj' transform property, when present, can have num_inputs equal to 1, and the input entity for the corresponding image operation can be a visual track.

In some embodiments, the transform property can assume the input and (derived) output tracks are an OMAF-compliant tracks. When the operation is a (forward) projection construction (e.g., is_reverse==0), the input track can be an un-projected picture track, the output track can be a projected picture track, and the projection format packing structure ProjectionFormatStruct( ) can be signaled (e.g., within ProjectionFormatProperty) to indicate the projection format in the projected pictures. When the operation is a reverse projection construction (e.g., is_reverse==0), the input track can be a projected picture track which has a projection format item property containing a ProjectionFormatStruct( ) structure, the output track can be an un-projected picture track, and the projection format structure ProjectionFormatStruct( ) can be the input track used to indicate the projection format in the projected pictures.

In some examples, the introduction of the indicator can be for syntax compactness purposes; it is possible to specify transform properties for projection and reverse projection separately. In some examples, the constraint num_inputs equal to 1 for the projection operation can be relaxed to allow the operation to apply to each of the input tracks individually; that is, to construct num_inputs projected or unprojected tracks (e.g., as described further in conjunction with track group derivation herein). In some examples, even for the reverse projection construction, ProjectionFormatStruct( ) can be signaled, such as for the purpose of overwriting its corresponding one in the input projected picture track.

FIGS. 8A and 8B are exemplary syntaxes 800 and 850, respectively, for a projection transform property, according to some embodiments. Each syntax 800 and 850 includes is_reverse 802, which can indicate if the operation is a (forward) projection (e.g., when equal to 0) or a reverse projection (e.g., when equal to 1). The ProjectFormatStruct ( ) 804 and projection_type 806 can have the same syntax and semantics as provided in OMAF.

In some embodiments, a packing transform property can be provided, such as the packing 'pack' transform property, which can be optional for each sample and specified in any quantity. The packing 'pack' transform property can provide information for the process of transformation, resizing, and relocating of regions of an input track to form a derived track, according to a packing scheme such as the region-wise packing given in OMAF. An indicator is_reverse can be used to indicate whether the operation is a (forward) packing construction or reverse unpacking one. The packing 'pack' transform property, when present, can have num_inputs is equal to 1, and the input entity for the corresponding image operation can be a visual track.

In some examples, this transform property can assume the input and (derived) output tracks are OMAF compliant tracks. When the operation is a (forward) packing construction (e.g., is_reverse==0), the input track is a projected picture track, the output track can be a packed picture track, and the region-wise packing structure RegionWisePackingStruct( ) can be signaled to indicate the location, shape, and size of each packed region in the packed pictures. When the operation is a reverse packing (or unpacking) construction (e.g., is_reverse==0), the input track can be a packed picture track which has a region-wise packing item property containing a RegionWisePackingStruct( ) structure, the output track can be a projected picture track, and the region-wise packing structure RegionWisePackingStruct( ) in the input track can be used to indicate the location, shape, and size of each packed region in the packed pictures.

In some examples, the introduction of the indicator can be for the syntax compactness purpose; it is possible to specify transform properties for packing and reverse packing separately. In some examples, the constraint num_inputs equal to 1 for the packing operation can be relaxed to allow the operation to apply to each of the input tracks individually; that is, to construct num_inputs packed or unpacked tracks (e.g., as discussed in conjunction with track group derivation herein). In some examples, even for the reverse packing construction, RegionWisePackingStruct( ) can be signaled, such as for the purpose of overwriting its corresponding one in the input packed picture track.

Figure 9:
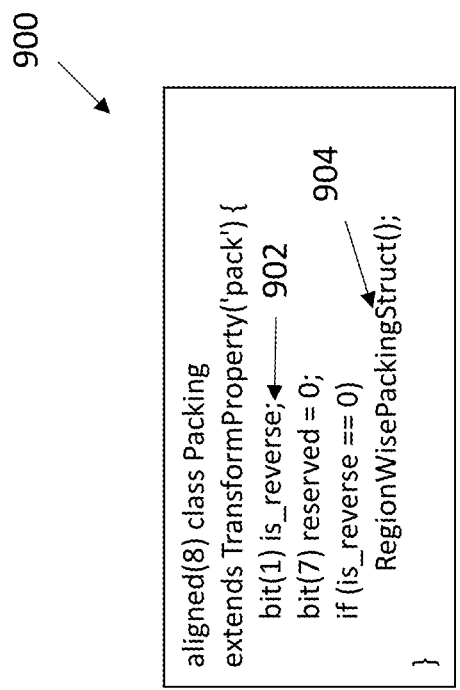
FIG. 9 shows an exemplary syntax for a packing transform property, according to some embodiments.

FIG. 9 shows an exemplary syntax 900 for a packing transform property, according to some embodiments. The field is_reverse 902 can indicate if the operation is a (forward) packing (e.g., equal to 0) or a reverse packing (e.g., equal to 1). In some embodiments, the RegionWisePackingStruct( ) 904 can have the same semantics as the metadata provided in OMAF.

In some examples, the structure of the packing transform property can be similar to that of RegionWisePackingBox in OMAF, with the consideration that the inputs to the operation are input tracks, not input regions, whose number is specified by num_inputs, not num_regions, and some simplification on not requiring each input track with its own packing_type. It should be appreciated that other structures besides those discussed herein can be introduced in a similar manner if non-region-wise packing schemes or other packing types are to be used.

In some embodiments, a sub-picture transform property can be provided, such as the sub-picture 'subp' transform property, which can be optional for each sample and specified in any quantity. The sub-picture 'subp' transform property can construct a sub-picture track from an input composite (or super-picture) track, or compose a composite picture track from a number of input sub-picture tracks, according to a sub-picture track or track group specification (e.g., such as the one for a sub-picture track group given in OMAF). An indicator is_reverse can be used to indicate whether the operation is a (forward) sub-picture construction or reverse composite picture one.

In some embodiments, the sub-picture 'subp' transform property, when present, can have a num_inputs greater or equal to 1, and the input entities for the corresponding image operation can be visual tracks. When the operation is a (forward) sub-picture construction, num_inputs can be equal to 1, each visual sample image in the input track can be larger than or equal to the size signaled in SpatialRelationship2DSourceBox( ) and the portion of the image used for the sub-picture construction can be measured from the origin of the input image with the size and coordinates signaled in the SubPictureRegionBox( ) When the operation is a reverse composite picture construction, the input tracks can be constrained to belong to a same sub-picture track group, each containing a sub-picture track group box SpatialRelationship2DDescriptionBox with track_group_type equal to '2dcc', but no any two of the tracks belong to a same alternate group (e.g., they contain no Track Header Box 'tkhd' with a same non-zero alternate_group value that indicates they belong to a same alternate group for the purpose of selecting only one from the alternate group).

In some examples, the introduction of the indicator is_reverse can be for the purpose of minimizing a number of transform properties; it should be appreciated that it is possible to define transform properties for sub-picture and reverse composite picture constructions, separately. In some examples, even for the composite picture construction, SpatialRelationship2DSourceBox( ) and SubPictureRegionBox( ) can be signaled, such as for the purpose of overwriting their corresponding boxes in the input sub-picture tracks. In some examples, the sub-picture transform property can be different from the transform property for "Region of interest (ROI) selection", "2dcc", as the latter requires two input tracks, one visual and the other timed metadata for providing potentially time variant ROI information, whereas the sub-picture transform property can be used to select a static and fixed rectangular region.

Figure 10:
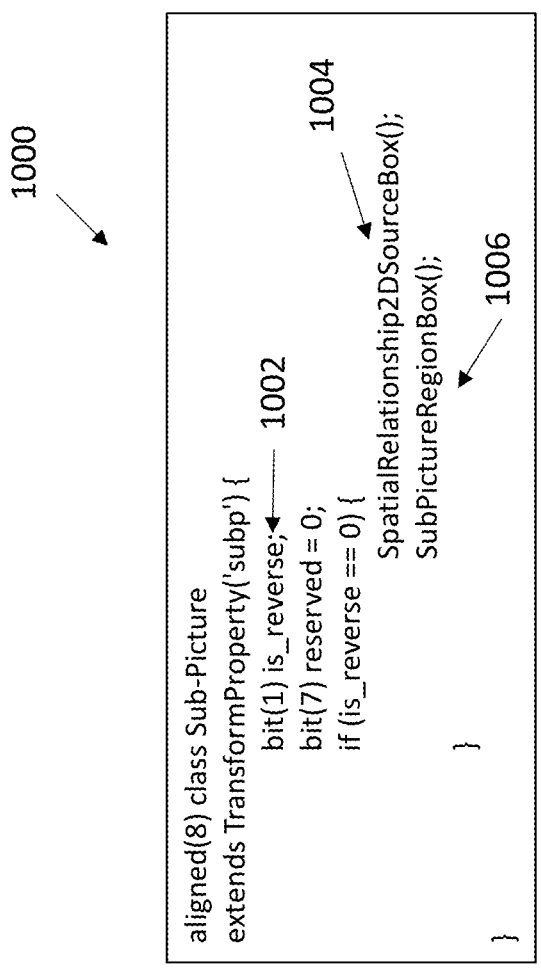
FIG. 10 shows an exemplary syntax for a sub-picture transform property, according to some embodiments.

FIG. 10 shows an exemplary syntax for a sub-picture transform property, according to some embodiments. The field is_reverse 1002 indicates if the operation is a (forward) sub-picture division (e.g., is equal to 0) or a reverse sub-picture composition (e.g., is equal to 1). The SpatialRelationship2DSourceBox( ) 1004 and SubPictureRegionBox( ) 1006 can have the same syntax and semantics as defined in the working draft of the second edition of OMAF, as described in w17827, "WD of ISO/IEC 23090-2 2nd edition OMAF", July 2018, Ljubljana, SK, which is hereby incorporated by reference herein in its entirety. They specify, respectively, the size of the composite picture, and the size and location of each sub-picture.

In some embodiments, a transcoding transform property can be provided, such as the transcoding 'trsc' transform property, which can be optional for each sample and specified in any quantity. The transcoding 'trsc' transform property can provide information for the process of transcoding images of an input track at a desired bitrate to form a transcoded visual track, according to given parameters (e.g., such as blending parameters, such as those used for image stitching as described herein). The transcoding 'trsc' transform property, when present, can have num_inputs equal to 1, and the input entity for the corresponding transcoding operation can be a visual track. The transform property can specify a desired bitrate, a frame rate, and reference width and height of a derived sample transcoded from the input entity. It should be appreciated that the transcoding transform property only shows as an example for transcoding. Other types of transcoding properties can be specified, such as for a capped bit rate, "pre-transcoding" as given in the NBMP use cases and requirements in N17502, and/or the like.

Figure 11:
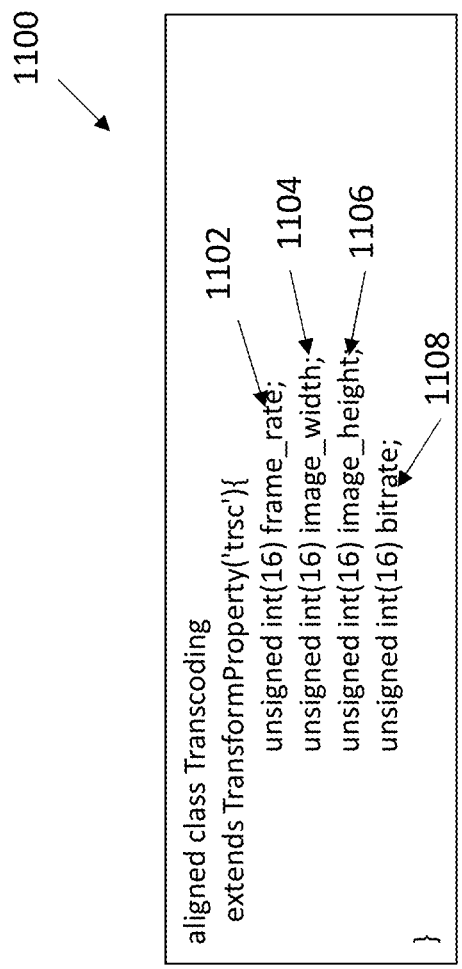
FIG. 11 shows an exemplary syntax for a transcoding transform property, according to some embodiments.

FIG. 11 shows an exemplary syntax 1100 for a transcoding transform property, according to some embodiments. The frame_rate 1102 can specify the number of frame images per second, multiplied by 100, of the transcoded visual track. The image_width 1104 and image_height 1106 can specify, respectively, the width and height of the transcoded image in units of luma samples. The bitrate 1108 can specify the constant or capped bitrate of the transcoded visual track in kbits/s.

In some embodiments, a viewport transform property can be provided, such as the viewport 'vpot' transform property, which can be optional for each sample and specified in any quantity. The viewport 'vpot' transform property can construct (or extract) viewport sample images from spherical sample images of an input omnidirectional video track, according to a viewport specification such as the specification for a (timed) sphere region given in OMAF. The viewport 'vpot' transform property, when present, can have a num_inputs equal to 2. The input entities for the corresponding image operation can be an omnidirectional video track and a sphere region timed metadata track, such as the 'rosc' (sphere region) or 'rcvp' (recommended viewport) timed metadata track, with a 'cdsc' track reference to the video track.

In some embodiments, the viewport transform property can use the sphere region metadata of the timed metadata track to extract viewport samples from the samples of the input video track. In other words, the sphere region metadata track can be applied prescriptively to the video track that is the input entity for the viewport transform property. The output of the image operation can contain only the sphere region specified by the sphere region metadata track. In some embodiments, when a static, fixed viewport is desired, a separate transform property can be specified using only a single sphere region definition, such as the sphere region structure SphereRegionStruct( ) in OMAF, rather than using the timed sphere region metadata track.

In some embodiments, a selection of one transform property can be provided, such as the selection of one 'sel1' transform property, which can be optional for each sample and specified in any quantity. The selection of one 'sel1' transform property constructs sample images by selecting them from one of the input visual tracks that belong to a same alternate group. This transform property, when present, can have a number of input entries num_input greater or equal to 1, and the input entities can be visual tracks belonging to a same alternate group (e.g., the same alternate group specified in ISOBMFF). The transform property can specify a derived track, each of whose samples is a sample image selected from one of the input tracks. In some embodiments, if selecting one track from a list of input tracks in an alternate group is the goal, then a separate transform property, such as selection of one track (or entity), can be defined. Moreover, the Selection of One transform property can be augmented with attributes and parameters to signal how the selection of sample images should be made based upon them.

Figure 12:
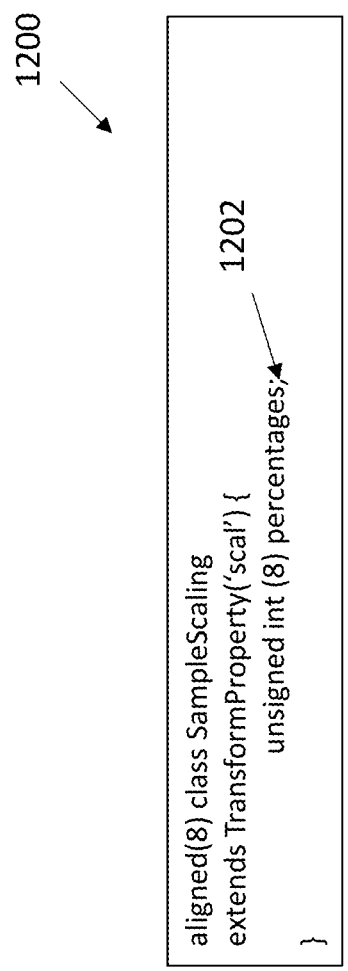
FIG. 12 shows an exemplary syntax for a scaling transform property, according to some embodiments

In some embodiments, a scaling transform property can be provided, such as the scaling 'scal' transform property, which can be optional for each sample and specified in any quantity. This scaling 'scal' transform property, when present, can have a number of input entries num_input equal to 1, and the input entity can be a visual track or an image item. The transform property can scale the sample images of the input visual track in units of percentages. FIG. 12 shows an exemplary syntax 1200 for a scaling transform property, according to some embodiments. The percentages 1202 value divided by 100 can specify a scaling factor of the input sample images.

Figure 13:
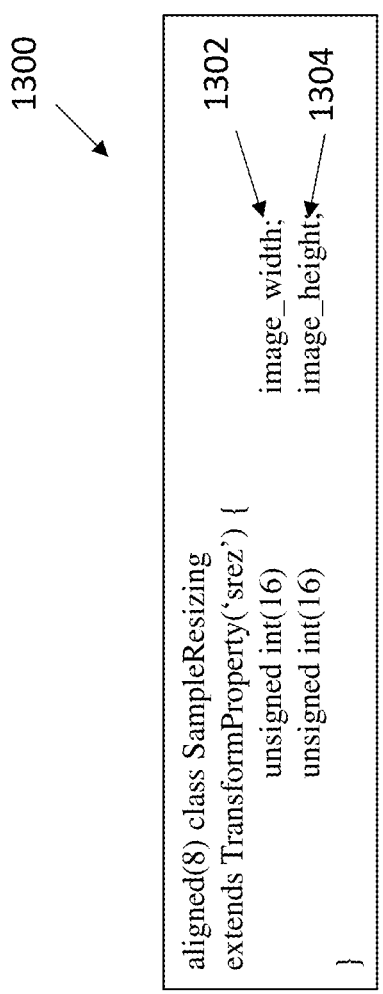
FIG. 13 shows an exemplary syntax for a resizing transform property, according to some embodiments.

In some embodiments, a resizing transform property can be provided, such as the resizing 'srez' transform property, which can be optional for each sample and specified in any quantity. The resizing 'srez' transform property, when present, can have a number of input entries num_input equal to 1, and the input entity can be a visual track. The transform property can resize sample images of the input visual track according to a width and a height. FIG. 13 shows an exemplary syntax 1300 for a resizing transform property, according to some embodiments. The image_width 1302 and image_height 1304 give respectively the width and height of the resized input sample images.

The techniques described herein provide for deriving a collection of tracks, or a track group. By default, existing track derivation options (e.g., those listed in the ISOBMFF TuC described in N17833) consider a single derived track as the output of the track derivation. The inventors have discovered and appreciated that in some cases, such as transcoding and sub-picture generation where track derivation is often used to generate a group of tracks (e.g., a set of tracks with different bitrates and a collection of sub-picture tracks), it is desirable to have a derived track group as the output. According to some embodiments, a new track group derivation mechanism (e.g., based on aspects of the track derivation mechanism list in the ISOBMFF TuC), with features to support derivation of a track group. In some embodiments, a field (e.g., 'num_outputs' or 'output_count') can be used to signal the number of output derived tracks (or entities), in addition to the number of inputs or entities (e.g., 'num_inputs' for options 1-3, or 'input_count' for option 4 in the TuC).

FIG. 14 shows an exemplary syntax 1400 for outputting a group of tracks, according to some embodiments. FIG. 14 shows an example of the syntax and semantics of Option 3 in the TuC, adopted for track group derivation to include a num_outputs field 1404 and the associated processing of num_outputs 1404 using the for loop, as shown in the syntax 1400. The num_inputs 1402 can specify the number of input entities for this image operation. When set to 0, it can indicate the only input is the output of the preceding ImageOperation. The num_outputs 1404 can specify the number of out entities for this image operation. The entity_idx 1406 can either be a 1-based index to the TrackReferenceTypeBox of type 'dtrk', or the value 0 to indicate the output of the preceding ImageOperation. When entity_idx 1406 points to an ID value that resolves to a track ID of an image sequence track, the function IsPictTrack(entity_idx) can be specified to return 1, and otherwise the function IsPictTrack(entity_idx) can be specified to return 0. The sample_offset 1408 can be present if entity_idx 1406 refers to a track and sample_offset_flag is equal to 1, and it encodes the offset of the sample (positive or negative) with respect to the decode time of the derived sample. When not present, sample_offset 1408 is inferred to be equal to 0. In some examples, sample 0 (zero) is the sample with the same, or the closest preceding, decoding time compared to the decoding time of the sample of the derived visual track; sample 1 (one) is the next sample, sample −1 (minus 1) is the previous sample, and so on.

FIG. 15 shows another exemplary syntax 1500 for outputting a group of tracks, according to some embodiments. The syntax 1500 shows an example of the syntax and semantics of Option 4 in the TuC, adopted for track group derivation by including the class VisualDerivationOutputs class 'doup' and the VisualDerivaitonOutputs field outputs 1504 in the Visual Derivation 'dimg' class.

The techniques described herein can provide transform properties for derived track groups. For ease of explanation, two examples are provided herein, one for transcoding and another for sub-sub-pictures. For the examples that follow, forward transcoding can result in an alternate group of transcoded tracks, and forward sub-picture can result in a sub-picture track group of sub-picture visual tracks.

For transcoding, for example, it may be necessary to transcode multimedia data to a number of different bit rates. It can therefore be desirable for an MPE to be able to transcode multimedia data into a set of different bit rates. A transcoding transform property can be provided for creating an alternate group of tracks, such as the transcoding 'tcdb' transform property, which can be optional for each sample and specified in any quantity. Similar to the transcoding transform property discussed in conjunction with FIG. 11, the transcoding 'trsc' transform property, when present, can have num_inputs equal to 1, and the input entity for the corresponding transcoding operation can be a visual track. The transform property can specify a frame rate, reference width and height, and a desired bitrate of a derived sample transcoded from the input entity for each output transcoded track. The output transcoded visual tracks can form an alternate group (e.g., according to an alternate group according to ISOBMFF).

Figure 16:
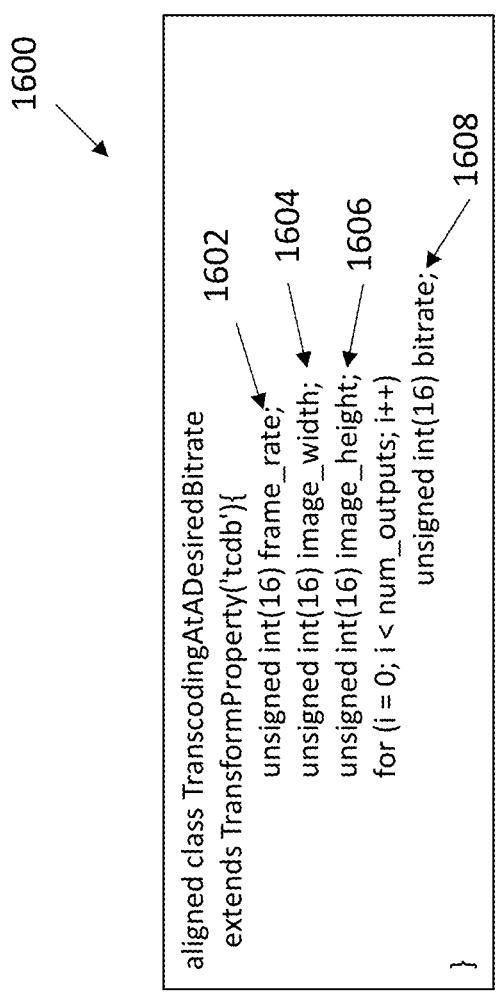
FIG. 16 shows an exemplary syntax for transcoding that can result in an alternate group of transcoded tracks, according to some embodiments.

FIG. 16 shows an exemplary syntax 1600 for transcoding that can result in an alternate group of transcoded tracks, according to some embodiments. The frame rate 1602 specifies the number of frame images per second, multiplied by 100, of the transcoded visual track. The image_width 1604 and image_height 1606 specify, respectively, the width and height of the transcoded image in units of luma samples. The bitrate 1608 specifies the constant or capped bitrate of the transcoded visual track in kbits/s.

Figure 17:
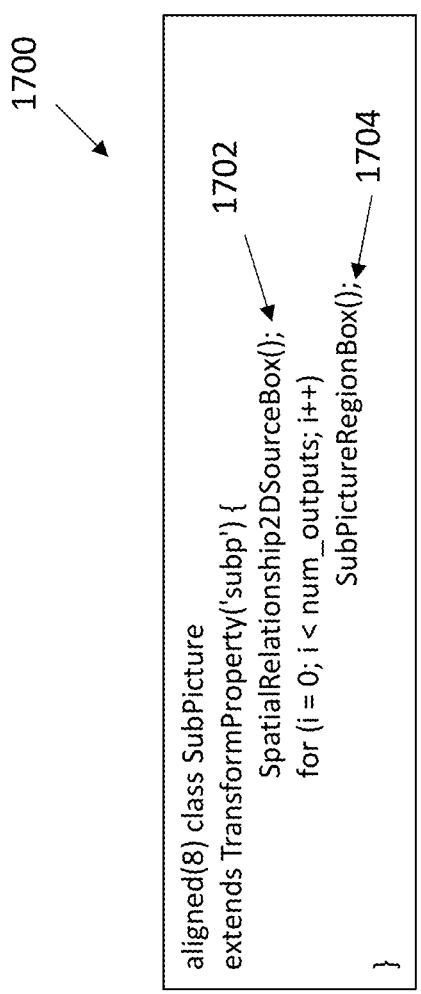
FIG. 17 shows an exemplary syntax for a sub-pictures transform property for creating a sub-picture track group of sub-picture visual tracks, according to some embodiments.

Like transcoding, it may be desirable to specify different sub-pictures, including how to divide a picture into sub-pictures. A sub-pictures transform property can be provided for creating a sub-picture track group of sub-picture visual tracks, such as the transcoding 'subp' transform property, which can be optional for each sample and specified in any quantity. The sub-pictures 'subp' transform property can construct a sub-picture track group of sub-picture tracks from an input composite (or super-picture) track, according to a sub-picture track or track group specification (e.g., such as the specification for a sub-picture track group given in OMAF). The sub-pictures 'subp' transform property, when present, can have a num_inputs equal to 1, and the input entity for the corresponding image operation can be a visual track. Each visual sample image in the input track can be larger than or equal to the size signaled in SpatialRelationship2DSourceBox( ) and the portions of the image used for the sub-picture construction are signaled in the SubPictureRegionBox( ) and measured from the origin of the input image. The output sub-picture visual tracks form a sub-picture track group (e.g., consistent with the sub-picture track group provided in the OMAF $2^{nd}$ edition). FIG. 17 shows an exemplary syntax 1700 for a sub-pictures transform property for creating a sub-picture track group of sub-picture visual tracks, according to some embodiments. The SpatialRelationship2DSourceBox( ) 1702 and SubPictureRegionBox( ) 1704 can have the same syntax and semantics as provided in the working draft of the second edition of OMAF in m40385. They can specify, respectively, the size of the composite picture, and the size and location of each sub-picture.

The techniques described herein can relate to the NBMP format (e.g., media and metadata) and the NBMP APIs for processing tasks, such as those formats/APIs described in N17874, "Description of Core Experiments on Network-Based Media Processing". July 2018, Ljubljana, SI, and N17502, "Use cases and requirements for NBMP (v4)", April 2018, San Diego, US, which are hereby incorporated by reference herein in their entirety. The techniques provide for leveraging the track derivation mechanism and track derivations (e.g., as described in N17833) for defining OMAF media processing related tasks in media processing architectures such as the NBMP architectures discussed in conjunction with FIGS. 6A-6B.

As described herein, media content dealt with in NBMP can be stored in an ISOBMFF compliant file format. Metadata related to the media content can be stored in 'mdat' boxes and timed metadata tracks ISOBMFF files. As also described herein, track derivations and track group derivations can be used as mechanisms to implement individual NBMP tasks at the file format level.

The techniques described herein provide for using format schema to specify NBMP tasks. At the NBMP level, such a format schema shall can be used to inform media processing nodes, such as MPEs, of an NBMP media processing task. The inventors have also discovered and appreciated that the file format level can include information that need not be repeated in the format schema. Therefore, instead of providing an XML format schema that repeats similar information of track derivation at the file format level (e.g., with regard to input specification, output specification and parameters specification), the techniques provide for a format schema that can be used to provide an XML document prior to availability of the media content.

FIG. 18 shows an exemplary XML format schema 1800, according to some embodiments. The nbmp:num_inputs 1802 and nbmp:num_outputs 1804 attributes and nbmp:dtrk element 1806 can be specified using the "urn:mpeg-i:nbmp:2018" namespace, as shown in the schema 1800. Such an XML format schema can be used to capture transform properties, including the properties described herein. FIG. 19 is an example XML element 1900 that captures the transcoding task 'tcdb,' according to some embodiments.

Figure 20:
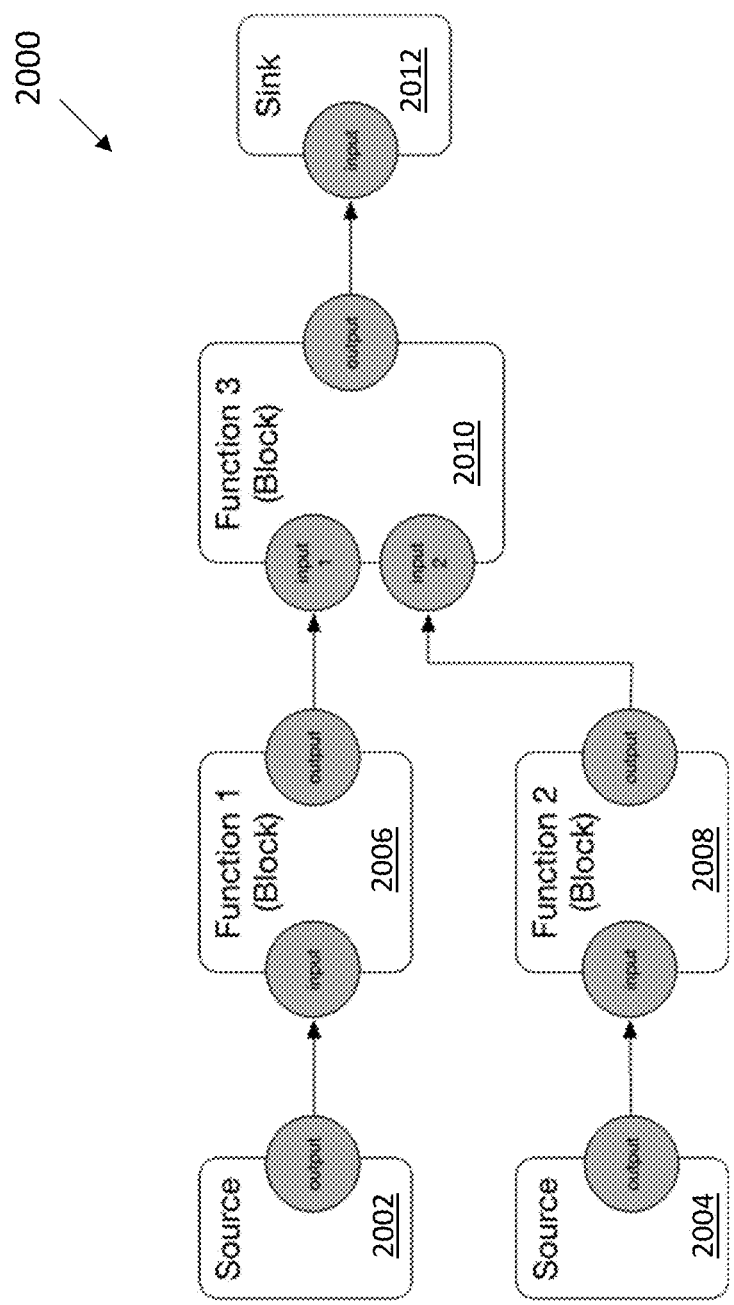
FIG. 20 shows an exemplary workflow of a set of media processing functions, according to some embodiments.

The approach for individual media processing functions described herein can be used to provide a foundation for defining an NBMP workflow schema for chaining and composing individual functions to implement composite media processing functions. FIG. 20 shows an exemplary workflow 2000 of a set of media processing functions, according to some embodiments. The workflow 2000 includes a first source 2002 and a second source 2004. The workflow also includes three functional blocks for function one 2006, function two 2008, and function three 2010. The source 202 provides the input to function block one 2006, and the source 2004 provide the input to function block two 2008. Both function block one 2006 and function block two 2008 provide input to function block three 2010. Function block three 2010 provides its output to the sink 2012. Therefore, as shown in FIG. 20, multiple function blocks can be used to implement one or more different media processing functions. It should be appreciated that the exemplary number of blocks and flow among the various components of the workflow 2000 is for exemplary purposes and is not intended to be limiting. Any number and/or flow can be used to implement desired functionality without departing from the spirit of the techniques described herein.

Figure 21:
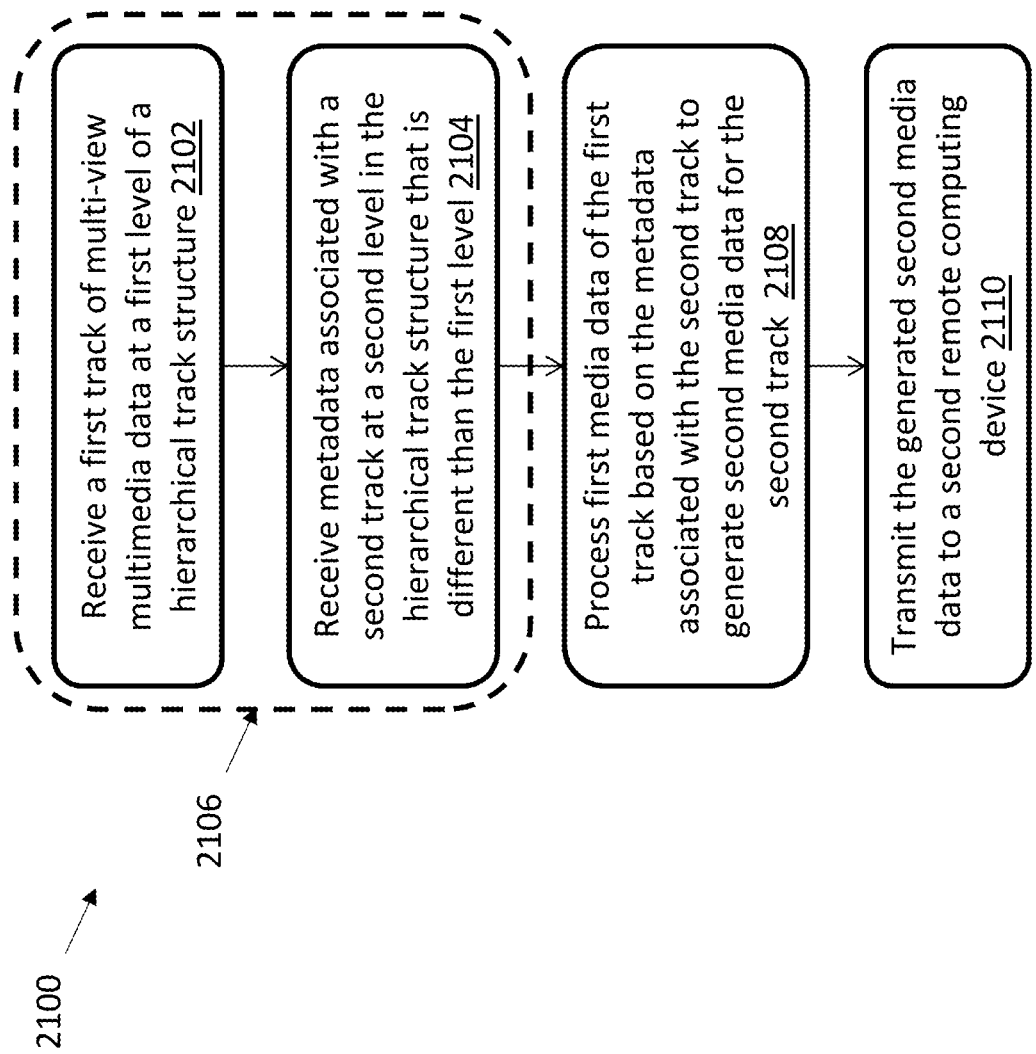
FIG. 21 is a flow diagram of an exemplary computerized process for a media processing entity to perform media processing, according to the techniques described herein.

As described herein, various numbers of MPEs can be used to perform desired media processing functionality. FIG. 21 is a flow diagram of an exemplary computerized process 2100 for an MPE to perform media processing, according to the techniques described herein. At steps 2102 and 2104, the MPE receives, from a remote computing device (e.g., from a media source and/or from another MPE), multi-view multimedia data comprising a hierarchical track structure. In particular, at step 2102, the MPE receives a first track comprising first media data at a first level of the hierarchical track structure, which can be, for example, one or more input tracks. At step 2104, the MPE receives metadata associated with a second track at a second level in the hierarchical track structure that is different than the first level of the first track, which can be a derived track. As described herein, the derived track can specify (e.g., using an XML structure) one or more transform properties to perform on input tracks. Steps 2102 and 2104 are shown in the dotted box 2106 to indicate that steps 2102 and 2104 can be performed separately and/or at the same time. Additionally, as described herein, the MPE may receive input track(s) from a plurality of different remote devices. At step 2108, the MPE processes (e.g., encodes or decodes) the first media data of the first track based on the metadata associated with the second track to generate second media data (e.g., samples) for the second track.

At step 2110, the MPE transmits the generated second media data to a second remote computing device, such as another MPE, sink device, and/or the like. As described herein, the output can include one or more output tracks (e.g., such as a track group). In some embodiments, the MPE can also transmit metadata associated with a third track at a third level in the hierarchical track structure that is different than the first level of the first track and the second level of the second track. As described herein, for example, the third track can be another derived track that specifies one or more transform properties to perform on one or more input tracks.

Referring to steps 2102 and 2104, the metadata associated with the second track can specify one or more decoding (or reverse) transform properties. For example, the second level in the hierarchical track structure can be above the first level of the first track, and the MPE can decode the first media data of the first track (e.g., which may include multiple input tracks) to generate the second media data for the second track.

As described herein, various such transform properties can be specified by the metadata of the derived track. For example, the metadata can specify a stitching operation to stitch images of the first media data of the first track and map the stitched images onto a projection surface to generate the second media data. As another example, the metadata can specify a reverse projection operation to project images of the first media data onto a three-dimensional sphere to generate the second media data. As a further example, the metadata can specify a reverse packing operation to perform one or more of transforming, resizing, and relocating one or more regions of the first media data to generate the second media data. As another example, the metadata can specify a reverse sub-picture operation to compose the second media data from a plurality of tracks, the plurality of tracks comprising the first track and one or more additional tracks. As a further example, the metadata can specify a selection of one operation to construct sample images from the first media data to generate the second media data. As another example, the metadata can specify a transcoding operation to transcode the first media data from a first bitrate to a second bitrate to generate the second media data. As a further example, the metadata can specify a scaling operation to scale the first media data from a first scale to a second scale to generate the second media data. As an additional example, the metadata can specify a resizing operation to resize the first media data from a first width and a first height to a second width and a second height to generate the second media data.

Referring further to steps 2102 and 2104, the metadata associated with the second track can specify one or more encoding transform properties. For example, the second level in the hierarchical track structure can be below the first level of the first track, and the MPE can encode the first media data of the first track to generate the second media data for the second track.

As described herein, various such transform properties can be specified by the metadata of the derived track. For example, the metadata can specify a projection operation to project images of the first media data onto a two-dimensional plane to generate the second media data. As another example, the metadata can specify a packing operation to perform one or more of transforming, resizing, and relocating one or more regions of the first media data to generate the second media data. As a further example, the metadata can specify a sub-picture operation to compose a plurality of different media data for a plurality of tracks, the plurality of tracks comprising the second track and one or more additional tracks. As another example, the metadata can specify a viewport operation to construct viewport sample images from spherical sample images of the first media data to generate the second media data. As a further example, the metadata can specify a transcoding operation to transcode the first media data from a first bitrate to a second bitrate to generate the second media data. As another example, the metadata can specify a scaling operation to scale the first media data from a first scale to a second scale to generate the second media data. As a further example, the metadata can specify a resizing operation to resize the first media data from a first width and a first height to a second width and a second height to generate the second media data.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A media processing method implemented by a media processing entity comprising at least one processor in communication with a memory, wherein the memory stores computer-readable instructions that, when executed by the at least one processor, cause the at least one processor to perform:
   receiving, from a remote computing device, encoded multi-view multimedia data comprising a hierarchical track structure comprising at least:
      a first track comprising first video media data at a first level of the hierarchical track structure, wherein the first track comprises a first set of samples that comprise first video media data; and
      a second track at a second level in the hierarchical track structure that is different than the first level of the first track, wherein:
         the second track comprises a second set of samples, wherein at least one of the samples of the second set of samples comprises a transform property specifying a derivation operation to perform on the first video media of the first track;
         the second track is separate from the first track, such that the first track is not interleaved with the second track during encoding so that the first track can be received separately from the second track; and
         the second track does not comprise second video media data in the received encoded multi-view multimedia data;
   processing the first video media data of the first track, comprising performing the derivation operation specified by the transform property on the first video media data to generate the second video media data of a derived track; and
   transmitting, over a network, the derived track comprising the generated second video media data to a second computing device, wherein the second computing device comprises a second media processing entity, a second remote computing device, or both, which are different than the remote computing device and the media processing entity.

2. The method of claim 1, wherein receiving the multi-view media data from the remote computing device comprises receiving the multi-view media data from a second remote media processing entity.

3. The method of claim 1, further comprising transmitting, to the second media processing entity, metadata associated with a third track at a third level in the hierarchical track structure that is different than the first level of the first track and the second level of the second track.

4. The method of claim 1, wherein:
   the second level in the hierarchical track structure is above the first level of the first track so that the second video media is different than the first video media data of the first track; and
   processing the first video media data of the first track comprises decoding the first video media data of the first track prior to performing the derivation operation to generate the second video media data for the derived track.

5. The method of claim 4, wherein:
   the transform property specifies one or more of:
      a stitching operation to stitch images of the first video media data of the first track and map the stitched images onto a projection surface to generate the second video media data;
      a reverse projection operation to project images of the first video media data onto a three-dimensional sphere to generate the second video media data;
      a reverse packing operation to perform one or more of transforming, resizing, and relocating one or more regions of the first video media data to generate the second video media data;
      a reverse sub-picture operation to compose the second video media data from a plurality of tracks, the plurality of tracks comprising the first track and one or more additional tracks;
      a selection of one operation to construct sample images from the first video media data to generate the second video media data;
      a transcoding operation to transcode the first video media data from a first bitrate to a second bitrate to generate the second video media data;
      a scaling operation to scale the first video media data from a first scale to a second scale to generate the second video media data; and
      a resizing operation to resize the first video media data from a first width and a first height to a second width and a second height to generate the second video media data.

6. The method of claim 1, wherein:
   the second level in the hierarchical track structure is below the first level of the first track; and
   processing the first video media data of the first track comprises encoding the first video media data of the first track to generate the second video media data for the derived track.

7. The method of claim 6, wherein:
   the transform property specifies one or more of:
      a projection operation to project images of the first video media data onto a two-dimensional plane to generate the second video media data;
      a packing operation to perform one or more of transforming, resizing, and relocating one or more regions of the first video media data to generate the second video media data;
      a sub-picture operation to compose a plurality of different media data for a plurality of tracks, the plurality of tracks comprising the second track and one or more additional tracks;
      a viewport operation to construct viewport sample images from spherical sample images of the first video media data to generate the second video media data;
      a transcoding operation to transcode the first video media data from a first bitrate to a second bitrate to generate the second video media data;
      a scaling operation to scale the first video media data from a first scale to a second scale to generate the second video media data; and
      a resizing operation to resize the first video media data from a first width and a first height to a second width and a second height to generate the second video media data.

8. The method of claim 1, wherein the transform property specifies a plurality of output tracks, and specifies how to generate each of the plurality of output tracks.

9. The method of claim 1, wherein the second track comprises a data structure specifying the transform property to perform on the first video media data to generate the second video media data, the data structure comprising a number of inputs, a number of outputs, and the transform property.

10. The method of claim 9, wherein the second track comprises the data structure.

11. An apparatus configured to process video data, the apparatus comprising a processor in communication with memory, the processor being configured to execute instructions stored in the memory that cause the processor to:
receive, from a remote computing device, encoded multi-view multimedia data comprising a hierarchical track structure comprising at least:
a first track at a first level of the hierarchical track structure, wherein the first track comprises a first set of samples that comprise first video media data; and
a second track at a second level in the hierarchical track structure that is different than the first level of the first track, wherein:
the second track comprises a second set of samples, wherein at least one of the samples of the second set of samples comprises a transform property specifying a derivation operation to perform on the first video media of the first track;
the second track is separate from the first track, such that the first track is not interleaved with the second track during encoding so that the first track can be received separately from the second track; and
the second track does not comprise second video media data in the received encoded multi-view multimedia data;
process the first video media data of the first track, comprising performing the derivation operation specified by the transform property on the first video media data to generate second video media data of a derived track; and
transmit, over a network, the derived track comprising the generated second video media data to a second computing device, wherein the second computing device comprises a second media processing entity, a second remote computing device, or both, which are different than the remote computing device and the apparatus.

12. The apparatus of claim 11, wherein receiving the multi-view media data from the remote computing device comprises receiving the multi-view media data from a second remote media processing entity.

13. The apparatus of claim 11, wherein the instructions further cause the processor to transmit metadata associated with a third track at a third level in the hierarchical track structure that is different than the first level of the first track and the second level of the second track, to the second computing device.

14. The apparatus of claim 11, wherein:
the second level in the hierarchical track structure is above the first level of the first track so that the second video media is different than the first video media data of the first track; and
processing the first video media data of the first track comprises decoding the first video media data of the first track prior to performing the derivation operation to generate the second video media data for the derived track.

15. The apparatus of claim 14, wherein:
the transform property specifies one or more of:
a stitching operation to stitch images of the first video media data of the first track and map the stitched images onto a projection surface to generate the second video media data;
a reverse projection operation to project images of the first video media data onto a three-dimensional sphere to generate the second video media data;
a reverse packing operation to perform one or more of transforming, resizing, and relocating one or more regions of the first video media data to generate the second video media data;
a reverse sub-picture operation to compose the second video media data from a plurality of tracks, the plurality of tracks comprising the first track and one or more additional tracks;
a selection of one operation to construct sample images from the first video media data to generate the second video media data;
a transcoding operation to transcode the first video media data from a first bitrate to a second bitrate to generate the second video media data;
a scaling operation to scale the first video media data from a first scale to a second scale to generate the second video media data; and
a resizing operation to resize the first video media data from a first width and a first height to a second width and a second height to generate the second video media data.

16. The apparatus of claim 11, wherein:
the second level in the hierarchical track structure is below the first level of the first track; and
processing the first video media data of the first track comprises encoding the first video media data of the first track to generate the second video media data for the derived track.

17. The apparatus of claim 16, wherein:
the transform property specifies one or more of:
a projection operation to project images of the first video media data onto a two-dimensional plane to generate the second video media data;
a packing operation to perform one or more of transforming, resizing, and relocating one or more regions of the first video media data to generate the second video media data;
a sub-picture operation to compose a plurality of different media data for a plurality of tracks, the plurality of tracks comprising the second track and one or more additional tracks;
a viewport operation to construct viewport sample images from spherical sample images of the first video media data to generate the second video media data;
a transcoding operation to transcode the first video media data from a first bitrate to a second bitrate to generate the second video media data;
a scaling operation to scale the first video media data from a first scale to a second scale to generate the second video media data; and
a resizing operation to resize the first video media data from a first width and a first height to a second width and a second height to generate the second video media data.

18. The apparatus of claim 11, wherein the second track comprises a data structure specifying the transform property to perform on the first video media data to generate the second video media data, the data structure comprising a number of inputs, a number of outputs, and the transform property.

19. At least one computer readable storage medium storing processor-executable instructions that, when executed by at least one processor of a media processing entity, cause the at least one processor to perform:
- receiving, from a remote computing device, encoded multi-view multimedia data comprising a hierarchical track structure comprising at least:
  - a first track comprising first video media data at a first level of the hierarchical track structure, wherein the first track comprises a first set of samples that comprise first video media data; and
  - a second track at a second level in the hierarchical track structure that is different than the first level of the first track, wherein:
  - the second track comprises a second set of samples, wherein at least one of the samples of the second set of samples comprises a transform property specifying a derivation operation to perform on the first video media of the first track;
  - the second track is separate from the first track, such that the first track is not interleaved with the second track during encoding so that the first track can be received separately from the second track; and
  - the second track does not comprise second video media data in the received encoded multi-view multimedia data;
- processing the first video media data of the first track, comprising performing the derivation operation specified by the transform property on the first video media data to generate second video media data of a derived track; and
- transmitting, over a network, the derived track comprising the generated second video media data to a second computing device, wherein the second computing device comprises a second media processing entity, a second remote computing device, or both, which are different than the remote computing device and the media processing entity.

\* \* \* \* \*